United States Patent
Amano et al.

(10) Patent No.: US 8,574,745 B2
(45) Date of Patent: Nov. 5, 2013

(54) RESIN COMPOSITION AND ORGANIC-ELECTROLYTE BATTERY

(75) Inventors: Hiroshi Amano, Kanagawa (JP); Keiji Ogino, Kanagawa (JP); Kenji Hosaka, Kanagawa (JP); Ryouichi Senbokuya, Kanagawa (JP); Yoshio Shimoida, Kanagawa (JP); Hideaki Horie, Kanagawa (JP)

(73) Assignees: Nissan Motor Co., Ltd., Kanagawa (JP); Ajinomoto Co., Inc., Tokyo (JP)

( * ) Notice: Subject to any disclaimer, the term of this patent is extended or adjusted under 35 U.S.C. 154(b) by 4 days.

(21) Appl. No.: 13/325,647

(22) Filed: Dec. 14, 2011

(65) Prior Publication Data

US 2012/0156546 A1 Jun. 21, 2012

Related U.S. Application Data

(63) Continuation of application No. PCT/JP2010/060013, filed on Jun. 14, 2010.

(30) Foreign Application Priority Data

Jun. 15, 2009 (JP) ................. 2009-142774

(51) Int. Cl.
*H01M 6/42* (2006.01)
(52) U.S. Cl.
USPC .......................... 429/149; 429/122
(58) Field of Classification Search
USPC .......................................... 429/149
See application file for complete search history.

(56) References Cited

U.S. PATENT DOCUMENTS

| 4,593,069 A | * | 6/1986 | Kamagata et al. ............ 525/113 |
| 6,812,065 B1 | | 11/2004 | Kitamura |
| 2007/0004819 A1 | | 1/2007 | Lu et al. |
| 2008/0138706 A1 | | 6/2008 | Takayama et al. |
| 2009/0143511 A1 | * | 6/2009 | Ikezawa et al. ............... 524/127 |

FOREIGN PATENT DOCUMENTS

| JP | 56-032672 A | 4/1981 |
| JP | 1-40469 B2 | 8/1989 |
| JP | 2000-345010 A | 12/2000 |
| JP | 2004-075914 A | 3/2004 |
| JP | 2004-238555 A | 8/2004 |
| JP | 2004238555 A | * 8/2004 ............ C08G 59/44 |
| JP | 2004-315572 A | 11/2004 |
| JP | 2007-095653 A | 4/2007 |
| JP | 2007-106852 A | 4/2007 |
| JP | 2008-166256 A | 7/2008 |
| JP | 2008-528769 A | 7/2008 |
| JP | 2009-117052 A | 5/2009 |

* cited by examiner

*Primary Examiner* — Barbara Gilliam
*Assistant Examiner* — Gary Harris
(74) *Attorney, Agent, or Firm* — Foley & Lardner LLP

(57) ABSTRACT

Provided is a resin composition superior in the adhesiveness to a metal and having high organic solvent resistance, particularly, a resin composition preferable as a sealant for an organic electrolyte battery, which shows superior adhesiveness to a terminal or a collector made of a highly heat resistant metal such as stainless steel and nickel, does not easily develop degradation even when contacted with an organic electrolytic solution at a high temperature, and does not easily influence an electrolytic solution, and a highly reliable organic electrolyte battery wherein leaching of an electrolytic solution from an electrolyte layer is prevented by the resin composition.
A resin composition containing (A) an epoxy resin containing at least (E1) an epoxy resin having an aromatic ring and an alicyclic skeleton and (B) a latent curing agent.

18 Claims, 2 Drawing Sheets

RESIN COMPOSITION AND ORGANIC-ELECTROLYTE BATTERY

CROSS REFERENCES TO RELATED APPLICATIONS

This application is a continuation of International Patent Application No. PCT/JP2010/060013, filed on Jun. 14, 2010, and claims priority to Japanese Patent Application No. 2009-142774, filed on Jun. 15, 2009, both of which are incorporated herein by reference in their entireties.

TECHNICAL FIELD OF THE INVENTION

The present invention relates to a resin composition having superior adhesiveness to a metal and high organic solvent-resistance in combination, particularly, a resin composition preferable for sealant use for organic electrolyte battery and an organic electrolyte battery with high long-term reliability, which has a sealing part made of the resin composition.

BACKGROUND ART

In recent years, a compact, light-weight, high output and high energy density organic electrolyte battery is attracting attention as a secondary battery, and lithium ion secondary battery has become the mainstream. A sealant to be used therefor is a very important material that shuts off the organic electrolytic solution from the moisture of the outside world.

As a resin-based sealant, for example, polyolefin-based adhesive (patent document 1), polyvinylidene fluoride resin (patent document 2) and the like have been conventionally used.

In lithium ion secondary battery to be used as a drive battery of vehicles such as electric automobile (EV), hybrid electric automobile (HEV) and the like, improvement of the heat resistance of the battery has become an important problem to ensure long-term reliability of the battery. Therefore, stainless steel and nickel, which are high-heat-resistant metals, have been considered for a collector and an electrode terminal (tab) of an electrode, instead of aluminum conventionally used widely for lithium ion secondary battery, and a sealant to seal a battery is required to show superior adhesiveness to not only aluminum but also high-heat-resistant metal such as stainless steel, nickel and the like, and further required to show organic solvent-resistance that maintains adhered state even in contact with an organic electrolytic solution at a high temperature.

When an organic electrolyte battery such as lithium ion secondary battery and the like is used as a drive battery of a vehicle such as electric automobile, hybrid electric automobile and the like, the battery needs to have high capacitance and high voltage. In this case, stacked parallel battery and stacked series battery equipped with plural electric power components are advantageous. When the number of the electric power components is increased, however, the total thickness of the stacked battery increases, leading to scaling up, and the need arises to make electric power components (stacked unit of positive electrode/electrolyte layer/negative electrode) thinner. As a result, the gap between two pieces of collectors sandwiching an electric power component becomes narrower, and a highly reliable sealed structure is becoming difficult to form with conventional sealants such as polyolefin-based adhesive, polyvinylidene fluoride resin and the like.

The material used for an electrolyte layer to be interposed between a positive electrode and a negative electrode is not generally provided with high heat resistance. As a sealant to seal a gap between two pieces of collectors sandwiching an electric power component, one permitting a sealing work at a comparatively low temperature is advantageous. Thus, a sealant affording a high adhesive force to a metal at a low temperature is desired.

DOCUMENT LIST

Patent Documents patent document 1: JP-A-56-032672
patent document 2: JP-B-H1-040469

SUMMARY OF THE INVENTION

Problems to be Solved by the Invention

Accordingly, the problem to be solved by the present invention is to provide a resin composition superior in the adhesiveness to a metal (which exhibits superior adhesiveness particularly to high melting point metals such as stainless steel, nickel and the like), and having a superior organic solvent resistance.

In addition, the problem is to provide a resin composition superior in the adhesiveness to a metal (which exhibits superior adhesiveness particularly to high melting point metals such as stainless steel, nickel and the like), capable of forming an adhesion state with high adhesiveness at comparatively low temperature, and having a superior organic solvent resistance, which is particularly preferable as a sealant for organic electrolyte battery.

Moreover, the problem is to provide an organic electrolyte battery wherein a part to be sealed is sealed in a highly reliable sealed structure even if the part has a complicated shape or is a narrow gap and, particularly, an organic electrolyte battery wherein a highly reliable sealed structure seals the gap between two pieces of collectors sandwiching an electric power component, even if the gap is narrower than usual, and the sealing part exhibits stable sealing property for a long time.

Means of Solving the Problems

The present inventors have conducted intensive studies in an attempt to solve the above-mentioned problems and found that the above-mentioned problem can be solved by using, as an epoxy resin, at least an epoxy resin having an aromatic ring and an alicyclic skeleton and combining the epoxy resin with a particular curing agent, which resulted in the completion of the present invention.

Accordingly, the present invention provides the following.
(1) A resin composition comprising
(A) an epoxy resin comprising at least (E1) an epoxy resin having an aromatic ring and an alicyclic skeleton and
(B) a latent curing agent.
(2) The resin composition of the above-mentioned (1), wherein
(A) epoxy resin comprises (E1) epoxy resin, and (E2) a rubber-like core-shell polymer-modified epoxy resin.
(3) The resin composition of the above-mentioned (1) or (2), wherein (E1) epoxy resin is (E1-1) a terpene structural skeleton-containing epoxy resin having a cyclic terpene compound residue as an alicyclic skeleton.
(4) The resin composition of the above-mentioned (1) or (2), wherein (E1) epoxy resin is (E1-2) a dicyclopentadiene-type epoxy resin having a dicyclopentadiene residue as an alicyclic skeleton.

(5) The resin composition of the above-mentioned (2), comprising 60-80 parts by weight of (E1) epoxy resin and 20-40 parts by weight of (E2) rubber-like core-shell polymer-modified epoxy resin, per 100 parts by weight of (A) epoxy resin, wherein (E1) epoxy resin has a molar ratio of the aromatic ring and the alicyclic skeleton (aromatic ring/alicyclic skeleton) of not less than 2.5.

(6) The resin composition of the above-mentioned (2), comprising 18-24 parts by weight of (E1) epoxy resin, 42-56 parts by weight of a bisphenol-type epoxy resin, and 20-40 parts by weight of (E2) rubber-like core-shell polymer-modified epoxy resin, per 100 parts by weight of (A) epoxy resin, wherein (E1) epoxy resin has a molar ratio of the aromatic ring and the alicyclic skeleton (aromatic ring/alicyclic skeleton) of less than 2.5.

(7) The resin composition of any of the above-mentioned (1)-(6), wherein (B) latent curing agent is tertiary amino group-containing modified aliphatic polyamine.

(8) The resin composition of any of the above-mentioned (1)-(6), wherein (B) latent curing agent (B) is urea bond-containing modified polyamine.

(9) The resin composition of any of the above-mentioned (1)-(6), wherein (B) latent curing agent is urea bond- and imidazole group-containing modified polyamine.

(10) The resin composition of any of the above-mentioned (1)-(6), further comprising (C) a co-curing agent.

(11) The resin composition of the above-mentioned (10), wherein (C) co-curing agent is dicyandiamide.

(12) The resin composition of any of the above-mentioned (1)-(11), wherein a thermally-cured product has a glass transition temperature of not less than 100° C.

(13) The resin composition of any of the above-mentioned (1)-(12), which shows a peel strength of not less than 0.7 N/10 mm, when two pieces of stainless steel foil were laminated with the resin composition interposed therebetween to give a test piece and the test piece was subjected to T-peel at a peel rate of 100 mm/min according to JIS K-6854-3.

(14) The resin composition of any of the above-mentioned (1)-(13), for a sealant for sealing, in an organic electrolyte battery, a gap between an electrode terminal connected to a collector and an outer package and/or sealing a gap between marginal parts of the opposing collectors.

(15) A sealant for an organic electrolyte battery, comprising the resin composition of any of the above-mentioned (1)-(13).

(16) An organic electrolyte battery wherein the resin composition of any of the above-mentioned (1)-(14) seals a gap between an electrode terminal connected to a collector and an outer package and/or between marginal parts of the opposing collectors.

(17) The organic electrolyte battery of the above-mentioned (16), wherein the gap between the electrode terminal connected to the collector and the outer package and/or the gap between the marginal parts of the opposing collectors is/are within the range of 10-50 μm.

(18) The organic electrolyte battery of the above-mentioned (16) or (17), comprising a positive electrode having, on a collector, a positive electrode active material layer electrically connected thereto, a negative electrode having, on a collector, a negative electrode active material layer electrically connected thereto, and an electrolyte layer arranged in between the positive electrode and the negative electrode.

(19) The organic electrolyte battery of the above-mentioned (18), which is a stacked series battery wherein the positive electrode having the positive electrode active material layer electrically connected to one principal surface of the collector, the negative electrode having the negative electrode active material layer electrically connected to the other principal surface of said collector, and the electrolyte layer arranged in between a positive electrode and a negative electrode are alternately stacked.

(20) The organic electrolyte battery of any of the above-mentioned (16)-(19), wherein the collector and the electrode terminal are made of a stainless steel foil.

(21) An organic electrolyte battery comprising one or plural single-cell layers, each comprising a stacked unit of positive electrode/electrolyte layer/negative electrode between opposing collectors, wherein a gap between marginal parts of the opposing collectors is sealed by a cured product of the resin composition of any of the above-mentioned (1)-(13), the total thickness of the positive electrode/electrolyte layer/negative electrode is not more than 50 μm, and the cured product of the aforementioned resin composition was obtained by heating at not more than 100° C.

(22) The organic electrolyte battery of the above-mentioned (21), wherein the collector and the electrode terminal are made of a stainless steel foil.

(23) A functional chemical product comprising the resin composition of any of the above-mentioned (1)-(13).

Effect of the Invention

The resin composition of the present invention can be cured at a comparatively low temperature, and the cured product is superior in the adhesiveness to a metal, adheres to high melting point metals such as stainless steel, nickel and the like with a high adhesive force, and has a superior organic solvent resistance. In addition, the composition can be directly applied to a complicated shape and a narrow gap, and thermally cured.

Therefore, using the resin composition of the present invention as, for example, a sealant for an organic electrolyte battery, the gaps between marginal parts of the opposing collectors and between an electrode terminal and an outer package, in an electric power component, can be sealed to give a highly reliable sealed structure. As a result, a highly reliable organic electrolyte battery can be achieved, wherein a liquid junction (short-circuit) and the like due to leaching of an organic electrolytic solution from an electrolyte layer can be certainly prevented for a long time.

Moreover, the composition can seal a narrow gap between two opposing metal surfaces to give a highly reliable sealed structure, and the sealing work can be performed at a comparatively low temperature. Therefore, the composition can sufficiently deal with the thinning of an electric power component of an organic electrolyte battery.

DESCRIPTION OF EMBODIMENTS

Figure 1:
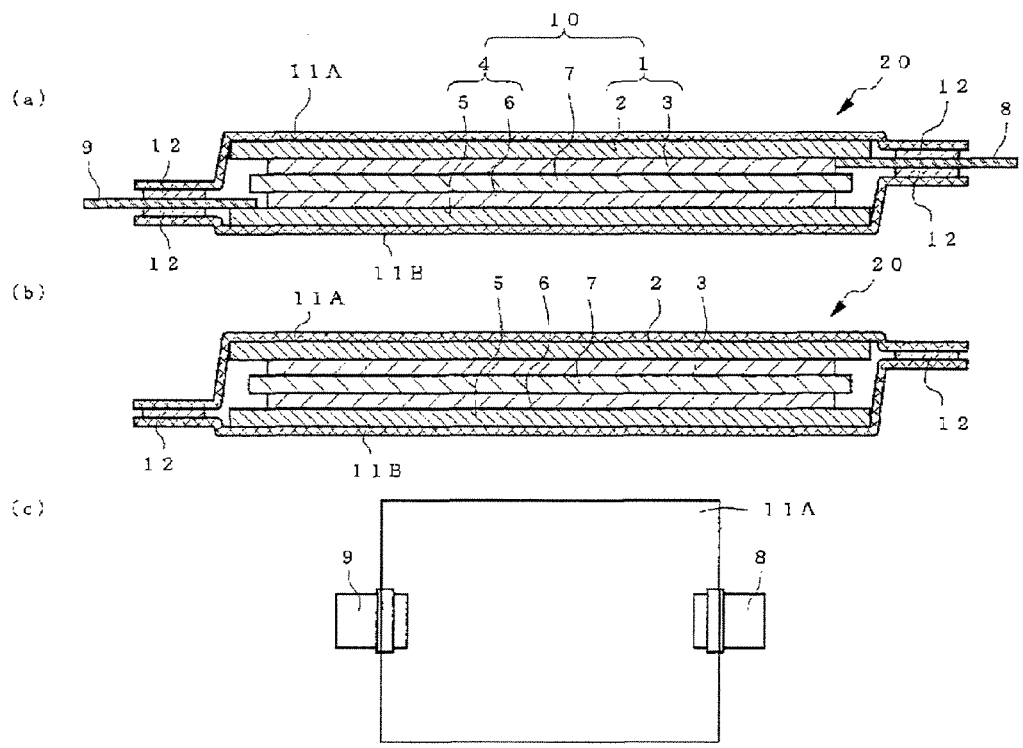
FIG. 1 provides sectional views (FIG. 1 (a), FIG. 1 (b)) and a plane view (FIG. 1 (c)) schematically showing an organic electrolyte battery of one example of the present invention.

The present invention is explained in the following by referring to its preferable embodiment.

The resin composition of the present invention is mainly characterized in that it contains (A) an epoxy resin containing at least (E1) an epoxy resin having an aromatic ring and an alicyclic skeleton, and (B) a latent curing agent.

[(A) Epoxy Resin]

The (A) epoxy resin in the present invention contains at least (E1) epoxy resin having an aromatic ring and an alicyclic skeleton.

In the present invention, the "(E1) epoxy resin having an aromatic ring and an alicyclic skeleton" is an epoxy resin wherein an aromatic ring such as benzene ring, naphthalene ring and the like, and an alicyclic skeleton having a carbon number of 6-11 (preferably 6-10) have been introduced into one molecule, and is not particularly limited as long as it is an epoxy compound having an unsaturated alicyclic compound residue as an alicyclic skeleton, which is synthesized by a known method from a polyaddition reaction product of phenols and naphthols, and an unsaturated alicyclic compound (e.g., cyclic terpene compound, dicyclopentadiene, tricyclopentadiene, 4-vinylcyclohexene, 5-vinylnorborn-2-en etc.) as a starting material. The form of the alicyclic skeleton may be any of monocyclic, bicyclic, condensed polycyclic, condensed polycyclic including bicyclic ring and the like, and the aromatic ring and alicyclic skeleton in one molecule may each be made of a single kind or two or more kinds thereof may be co-present. Of these, "(E1-1) terpene structural skeleton-containing epoxy resin" having a cyclic terpene compound residue as an alicyclic skeleton and "(E1-2) dicyclopentadiene-type epoxy resin" having a dicyclopentadiene residue as an alicyclic skeleton to be described in detail below are particularly preferably used.

<(E1-1) Terpene Structural Skeleton-Containing Epoxy Resin>

In the present invention, examples of (E1-1) terpene structural skeleton-containing epoxy resin include a reaction product obtained by adding (b) terpene structural skeleton-containing phenol compound to at least one kind of (a) epoxy resin selected from the group consisting of polyglycidyl ether of mononuclear polyhydric phenol, polyglycidyl ether of polynuclear polyhydric phenol wherein a bond binding each ring has a carbon number of 4 or below, and polyglycidyl ether of novolacs.

Specific examples of the above-mentioned (a) epoxy resin include mononuclear polyhydric phenol compounds such as hydroquinone, resorcin, pyrocatechol and the like; polynuclear polyhydric phenol compounds such as dihydroxynaphthalene, biphenol, methylenebisphenol (bisphenol F), ethylidenebisphenol (bisphenol AD), isopropylidenebisphenol (bisphenol A), thiobisphenol, methylenebis(orthocresol), isopropylidenebis(orthocresol), tetrabromobisphenol A, 1,3-bis(4-hydroxycumylbenzene), 1,4-bis(4-hydroxycumylbenzene), 1,1,3-tris(4-hydroxyphenyl)butane, 1,1,2,2-tetra(4-hydroxyphenyl)ethane, sulfobisphenol, oxybisphenol and the like; polyglycidyl ether of novolacs such as phenol novolac, orthocresol novolac, resorcin novolac, naphthol novolac and the like. One or more kinds of these can be used. Of these, an epoxy resin comprised of polyglycidyl ether of bisphenol (bisphenol A, bisphenol F, bisphenol AD etc.) is preferable, and an epoxy resin comprised of polyglycidyl ether of bisphenol F is particularly preferable.

The above-mentioned (b) terpene structural skeleton-containing phenol compound is obtained by adding phenols such as phenol, alkylphenol and the like to a cyclic terpene compound. The cyclic terpene compound may be a monocyclic terpene compound or a bicyclic terpene compound. Furthermore, the cyclic terpene compound(s) may be of a single kind, or two or more kinds. Specific examples include limonene (α-type, β-type), terbinolene, pinene (α-type, β-type), terpinene (α-type, β-type, γ-type), menthadiene (3,3-type, 2,4-type) and the like. On the other hand, examples of the phenols include phenol, cresol, xylenol, propylphenol, butylphenol, pentylphenol, amylphenol, octylphenol, nonylphenol, dodecylphenol, methoxyphenol, chlorophenol, bromophenol, 4-isopropyl-3-methylphenol, 5-methyl-2-(1-methylethyl)phenol and the like. One or more kinds of these can be used.

In (b) terpene structural skeleton-containing phenol compound, phenols can be easily added to a cyclic terpene compound by preferably using 0.5-5 mol of phenols relative to 1 mol of a cyclic terpene compound and, for example, reacting the mixture in the presence of an acid catalyst at 40-160° C. for 1-10 hr. In addition, the above-mentioned reaction can also be carried out in a solvent such as aromatic hydrocarbons, alcohols, ethers and the like. Furthermore, examples of the above-mentioned acid catalyst to be used in the above-mentioned reaction include hydrochloric acid, sulfuric acid, phosphoric acid, polyphosphoric acid, boron trifluoride or a complex thereof, activated clay and the like.

Specific examples of (b) terpene structural skeleton-containing phenol compound include compounds (1)-(11) having the following structures and the like. Of these, compounds (4)-(8) are preferable, and compound (5) is particularly preferable.

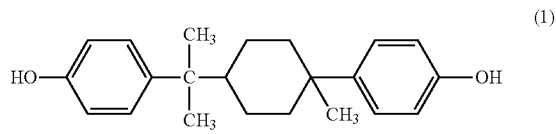

(1)

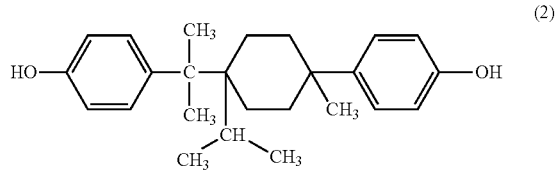

(2)

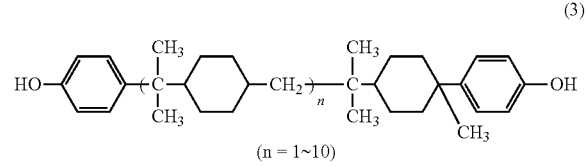

(3)

(n = 1~10)

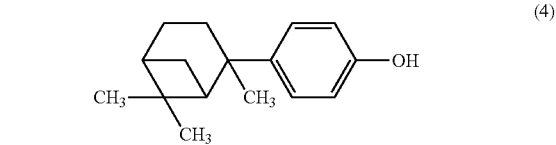

(4)

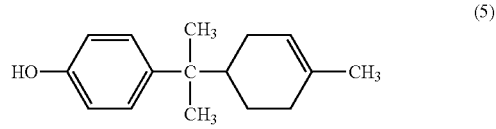

(5)

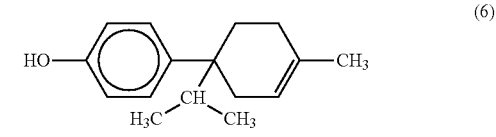

(6)

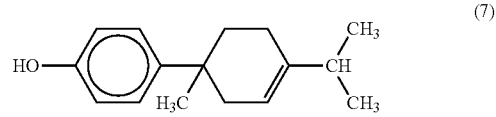

(7)

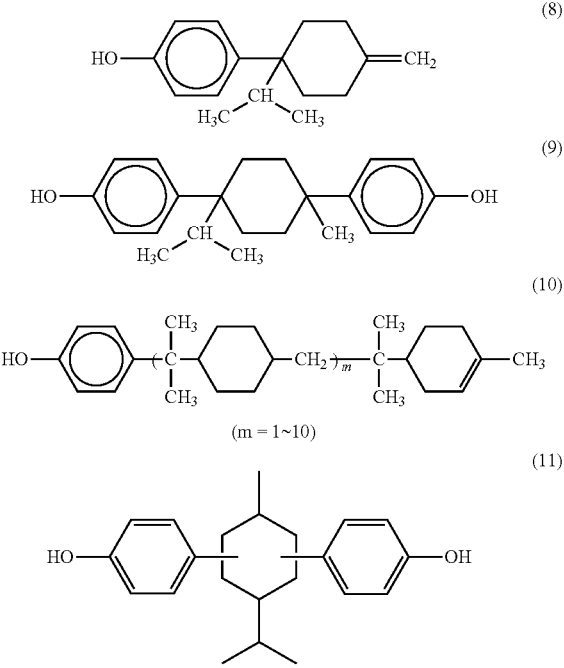

The (b) terpene structural skeleton-containing phenol compound may be a commercially available product. Specific examples include YP-90LL, Mightyace G125, Mightyace G150, Mightyace K125, YS Resin TO125, YS Resin TO115, YS Resin TO105, YS Resin TO85, YS Resin TR105TR, YS Resin Z115, YS Resin Z100, YS Polyster 2130, YS Polyster 2115, YS Polyster 2100, YS Polyster U115, YS Polyster T160, YS Polyster T145, YS Polyster T130, YS Polyster TH130, YS Polyster T115, YS Polyster T100, YS Polyster T80, YS Polyster T30, YS Polyster S145, and YS Polyster N125 (all are trade names manufactured by YASUHARA CHEMICAL Co., Ltd.).

As a method for obtaining an objective reaction product by adding (b) terpene structural skeleton-containing phenol compound to (a) epoxy resin, a conventional method of adding a phenol compound to an epoxy resin can be adopted. For example, a method of heating the both at 60-200° C. in the presence of a basic catalyst such as dimethylbenzylamine and the like, and the like can be used.

The quantitative ratio of (a) epoxy resin and (b) terpene structural skeleton-containing phenol compound is 0.05-0.8, preferably 0.1-0.7 of phenolic hydroxyl group of (b) terpene structural skeleton phenol compound per one epoxy group of (a) epoxy resin. Particularly, when a monophenol compound is used as the above-mentioned (b), the ratio is preferably 0.1-0.5. When the ratio of (b) terpene structural skeleton phenol compound to be used is less than the above-mentioned range (less than 0.05 hydroxyl group per one epoxy group), for example, adhesion of the resin composition to collectors and outer packages becomes insufficient when it is used as a sealant for an organic electrolyte battery. When it exceeds the above-mentioned range (more than 0.8 hydroxyl group per one epoxy group), for example, the epoxy equivalent becomes markedly high and hardenability of the objective resin composition becomes insufficient. When used as a sealant for an organic electrolyte battery, for example, sufficiently high electrolytic solution-resistance tends to be difficult to achieve.

In the present invention, (E1-1) terpene structural skeleton-containing epoxy resin may be polyglycidyl ether obtained by converting (b) terpene structural skeleton-containing phenol compound having two or more hydroxyl groups to glycidyl ether. In this case, the reaction of (b) terpene structural skeleton-containing phenol compound with epihalohydrin such as epichlorohydrin, epibromohydrin and the like can be carried out, for example, by adding sodium hydroxide and the like in the presence of an inert organic solvent (e.g., aprotic polar solvent such as isopropyl alcohol, dimethyl sulfoxide etc.). In addition, a quaternary ammonium salt may be used as a catalyst. Examples thereof include tetramethylammonium chloride, tetramethylammonium bromide, trimethylbenzylammonium chloride, triethylbenzylammonium chloride and the like.

The (E1-1) terpene structural skeleton-containing epoxy resin in the present invention may be a commercially available product. Examples thereof include EP9003 (epoxy equivalent: 250) manufactured by ADEKA CORPORATION, YL7291 (epoxy equivalent: 229) manufactured by Japan Epoxy Resins Co. Ltd., and the like.

<(E1-2) Dicyclopentadiene-Type Epoxy Resin>

The "(E1-2) dicyclopentadiene-type epoxy resin" to be used in the present invention is an epoxy resin (polyglycidyl ether) obtained by reacting a dicyclopentadiene skeleton-containing phenol compound or dicyclopentadiene skeleton-containing naphthol compound, which is obtained by reacting dicyclopentadiene with phenols or naphthols, with epihalohydrin such as epichlorohydrin, epibromohydrin and the like according to a conventional method.

The dicyclopentadiene skeleton-containing phenol compound and dicyclopentadiene skeleton-containing naphthol compound can be obtained by, for example, utilizing Friedel-Crafts reaction and by a method including reacting dicyclopentadiene with phenols or naphthols in the presence of an acid catalyst and the like. Examples of the phenols include o-cresol, m-cresol, p-cresol, 2,6-dimethylphenol, 2,4-dimethylphenol, 2-methylhydroquinone, resorcin, hydroquinone, catechol, bromophenol and the like. Examples of the naphthols include α-naphthol, β-naphthol, dihydroxynaphthalene and the like. The amount of the phenols (naphthols) to be charged is preferably not less than 1-fold molar equivalent, particularly preferably 3- to 8-fold molar equivalents, relative to the amount of dicyclopentadiene to be charged. The reaction conditions are preferably 10-200° C. for 30 min-7 hr. To be specific, when a boron trifluoride.phenol complex is used as a catalyst, for example, preferred range is 20-160° C., particularly preferred range is 50-150° C. After completion of the reaction, the catalyst is removed from the reaction mixture, and the reaction mixture is concentrated and the like to give a desired dicyclopentadiene skeleton-containing phenol compound (dicyclopentadiene skeleton-containing naphthol compound).

In the present invention, (E1-2) dicyclopentadiene-type epoxy resin is preferably an epoxy resin represented by the formula (III):

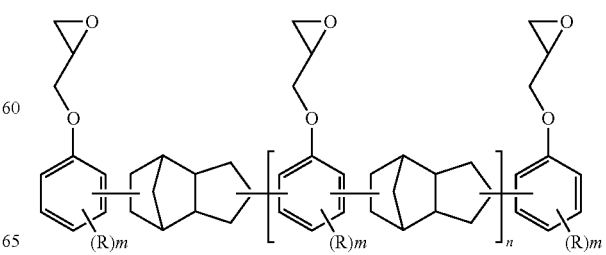

wherein R in the number of m are each independently a hydrogen atom, a methyl group, an ethyl group, a propyl group or a t-butyl group, n is an integer of 0-4, and m is an integer of 1-3, particularly preferably, an epoxy resin wherein R is a hydrogen atom or a methyl group (preferably m is 1). Such epoxy resin is commercially available from DIC Corporation under the names of EPICLON HP-7200 (epoxy equivalent: 258), HP-7200L (epoxy equivalent: 247), HP-7200H (epoxy equivalent: 280) and the like.

In the present invention, (E1) epoxy resin having an aromatic ring and an alicyclic skeleton preferably contains an epoxy equivalent of not less than 200, more preferably not less than 220, particularly preferably not less than 230. In addition, the epoxy equivalent is preferably not more than 2000, more preferably not more than 1500, specifically preferably not more than 300, particularly preferably not more than 260. When the epoxy equivalent is less than 200, for example, adhesion of the objective resin composition to collectors and outer package material becomes insufficient when it is used as a sealant for an organic electrolyte battery. When it exceeds 2000, the hardenability of the objective resin composition becomes insufficient. When used as a sealant for an organic electrolyte battery, for example, sufficiently high electrolytic solution-resistance tends to be difficult to achieve. The epoxy equivalent of the epoxy resin to be used in the present invention is a value measured according to the method described in JIS K 7236.

In addition, particularly from the aspect of adhesiveness of a resin composition to a metal, (E1) epoxy resin having an aromatic ring and an alicyclic skeleton preferably has an alicyclic skeleton content of preferably not less than 20 wt %, more preferably not less than 25 wt %. When the alicyclic skeleton content is too high, the electrolytic solution-resistance of the resin composition tends to decrease. Thus, the alicyclic skeleton content is preferably not more than 55 wt %, more preferably not more than 53 wt %. The alicyclic skeleton content here is a value shown by a weight proportion analyzed by gel permeation chromatography (GPC).

In addition, the molar ratio of aromatic ring and alicyclic skeleton (aromatic ring/alicyclic skeleton) in (E1) epoxy resin having an aromatic ring and an alicyclic skeleton is preferably 1.0-5.0, more preferably 1.5-3.0, from the aspects of adhesiveness and electrolytic solution-resistance of resin composition. When the molar ratio of aromatic ring and alicyclic skeleton (aromatic ring/alicyclic skeleton) is less than 1.0, the epoxy resin becomes semi-solid or solid, and the viscosity of a sealing material tends to be high. When it exceeds 5.0, the electrolytic solution-resistance and adhesiveness-improving effect afforded by the alicyclic skeleton tend to be difficult to achieve. The molar ratio of aromatic ring and alicyclic skeleton (aromatic ring/alicyclic skeleton) here is measured by structural analysis using any analysis method such as GPC, NMR and the like.

In the present invention, the amount of (E1) epoxy resin having an aromatic ring and an alicyclic skeleton to be used relative to the whole component A ((A) epoxy resin) is appropriately determined by the kind of (E1) epoxy resin having an aromatic ring and an alicyclic skeleton. It is generally 18-100 parts by weight (preferably 20-100 parts by weight) of (E1) epoxy resin having an aromatic ring and an alicyclic skeleton relative to 100 parts by weight of (A) epoxy resin. When the amount of (E1) epoxy resin having an aromatic ring and an alicyclic skeleton to be used is smaller than 18 parts by weight, the adhesiveness of the objective resin composition tends to decrease, and particularly, good adhesiveness to a heat resistant metal such as stainless steel and the like tends to be difficult to achieve.

In the present invention, examples of the epoxy resin that can be used in combination with (E1) epoxy resin having an aromatic ring and an alicyclic skeleton in (A) epoxy resin ("combined use epoxy resin") include aromatic epoxy resins such as bisphenol-type epoxy resin (bisphenol A-type epoxy resin, bisphenol F-type epoxy resin, bisphenol AD-type epoxy resin), biphenyl-type epoxy resin, novolac-type epoxy resin, naphthalene-type epoxy resin and the like, and rubber-like core-shell polymer-modified epoxy resin obtained by modifying these epoxy resins with a rubber-like core-shell polymer, and the like. Any one kind of these epoxy resins or two or more kinds thereof in a mixture may be used. These epoxy resins preferably have an epoxy equivalent of 150-300, more preferably 160-245.

From the aspects of electrolytic solution-resistance of the resin composition and adhesiveness thereof to collector and outer package material, liquid bisphenol A-type epoxy resin (e.g., "Epikote 828" (epoxy equivalent: 190) manufactured by Japan Epoxy Resins Co. Ltd., etc.), liquid bisphenol F-type epoxy resin (e.g., "Epikote 806" (epoxy equivalent: 165) manufactured by Japan Epoxy Resins Co. Ltd., "YDF8170" (epoxy equivalent: 160) manufactured by Tohto Kasei Co., Ltd. etc.), liquid bisphenol AD-type epoxy resin (e.g., "ZX1059" (epoxy equivalent: 165) manufactured by Tohto Kasei Co., Ltd., etc.) and (EC2) rubber-like core-shell polymer-modified epoxy resin obtained by modifying these epoxy resins with a rubber-like core-shell polymer (i.e., rubber-like core-shell polymer-modified bisphenol A-type epoxy resin, rubber-like core-shell polymer-modified bisphenol F-type epoxy resin, rubber-like core-shell polymer-modified bisphenol AD-type epoxy resin etc.) and the like are preferable, and liquid bisphenol F-type epoxy resin, liquid bisphenol AD-type epoxy resin, and rubber-like core-shell polymer-modified bisphenol A-type epoxy resin are particularly preferable.

Here, the "(E2) rubber-like core-shell polymer-modified epoxy resin" means an epoxy resin composition wherein a rubber-like core-shell polymer in a primary particle state is dispersed in an epoxy resin, which can be produced and, for example, by the method described in JP-A-2004-315572.

The (X) rubber-like core-shell polymer to be used for modification of an epoxy resin can be obtained by graft polymerizing 50-95 wt % of (X-1) rubber particulate core comprised of a rubber elastic body comprising not less than 50 wt % of one or more kinds of monomers selected from the group consisting of a diene-based monomer and a (meth)acrylate ester monomer, and less than 50 wt % of other copolymerizable vinyl monomer as monomer components, a polysiloxane rubber-based elastic body, or a mixture of these, and 5-50 wt % of (X-2) shell layer comprised of one or more kinds of monomers selected from the group consisting of (meth)acrylate ester, aromatic vinyl, vinyl cyanide, epoxyalkylvinylether, unsaturated acid derivative, (meth)acrylamide derivative and maleimide derivative.

As a diene-based monomer constituting (X-1) rubber particulate core, for example, butadiene, isoprene, chloroprene and the like can be mentioned, with preference given to butadiene. Examples of the (meth)acrylate ester-based monomer include butylacrylate, 2-ethylhexylacrylate, lauryl methacrylate and the like, with preference given to butylacrylate and 2-ethylhexylacrylate. Examples of other copolymerizable vinyl monomer include alkyl(meth)acrylate other than the aforementioned alkyl(meth)acrylate, vinyl aromatic-based monomer, vinylcyan-based monomer and the like. Examples of (meth)acrylate-based monomer include methyl (meth) acrylate, ethyl(meth)acrylate, and butyl(meth)acrylate, examples of vinyl aromatic-based monomer include styrene and α-methylstyrene, and examples of vinylcyan-based monomer include (meth)acrylonitrile and substituted acrylonitrile. One or more kinds of these can be used in combination. The amount thereof to be used is preferably less than 50 wt %, more preferably less than 40 wt %, relative to the total weight of (X-1) rubber particulate core.

In addition, as a component constituting (X-1) rubber particulate core, a polyfunctional monomer may be used to control the degree of crosslinking. Examples of polyfunctional monomer include divinylbenzene, butanediol di(meth)acrylate, triallyl(iso)cyanurate, allyl(meth)acrylate, diallyl itaconate, diallyl phthalate and the like. The amount thereof to be used is not more than 10 wt %, preferably not more than 5 wt %, more preferably not more than 3 wt %, of the total weight of the rubber particulate core.

The (X-2) shell layer has a function to provide an affinity for epoxy resin, so that (X) rubber-like core-shell polymer can be stably dispersed in the state of primary particles in an epoxy resin. A polymer constituting (X-2) shell layer is graft polymerized with a polymer constituting (X-1) rubber particulate core, and substantially preferably bonded to the polymer constituting (X-1) rubber particulate core. Specifically, preferably not less than 70 wt %, more preferably not less than 80 wt %, still more preferably not less than 90 wt %, of a polymer constituting (X-2) shell layer is desirably bonded to (X-1) rubber particulate core. The (X-2) shell layer is preferably one showing swellability, compatibility or affinity for epoxy resins.

The polymer constituting (X-2) shell layer is comprised of one or more kinds of monomers selected from the group consisting of (meth)acrylate ester, aromatic vinyl, vinyl cyanide, epoxyalkylvinylether, unsaturated acid derivative, (meth)acrylamide derivative and maleimide derivative. Specifically, examples thereof include methyl(meth)acrylate, ethyl(meth)acrylate, butyl(meth)acrylate, styrene, α-methylstyrene, (meth)acrylonitrile, (meth)acrylic acid, 2-hydroxyethyl(meth)acrylate, glycidyl(meth)acrylate, glycidyl vinyl ether, (meth)acrylamide, maleic anhydride, maleic acid imide and the like. One or more kinds of these can be used in an appropriate combination.

A preferable ratio (weight ratio) of (X-1) rubber particulate core/(X-2) shell layer of (X) rubber-like core-shell polymer is 50/50-95/5, more preferably 60/40-90/10.

The (X) rubber-like core-shell polymer can be produced by a well-known method, for example, emulsion polymerization, suspension polymerization, microsuspension polymerization and the like. Among these, a production method using emulsion polymerization is particularly preferable.

The particle size of (X) rubber-like core-shell polymer is not particularly limited, and one capable of stably obtaining (X) rubber-like core-shell polymer in the state of an aqueous latex can be used without any problem. From the aspect of industrial productivity, one having a volume average particle size of about 0.03-1 μm is more preferable since the production is easy. The volume average particle size can be measured by a micro-track method.

The (E2) rubber-like core-shell polymer-modified epoxy resin can be obtained by mixing a rubber-like core-shell polymer obtained in the state of an aqueous latex with an organic solvent to allow extraction of the rubber-like core-shell polymer into the organic phase, thereby obtaining a dispersion of the rubber-like core-shell polymer in the organic solvent, and mixing the dispersion with an epoxy resin.

The (E2) rubber-like core-shell polymer-modified epoxy resin preferably has a (X) rubber-like core-shell polymer content of 10-40 wt %.

The (E2) rubber-like core-shell polymer-modified epoxy resin is commercially available, and a commercially available product can be directly used. For example, Kane Ace MX120 (epoxy equivalent: 243), MX125 (epoxy equivalent: 243), MX130 (epoxy equivalent: 243), MX960 (epoxy equivalent: 245), MX965 (epoxy equivalent: 220), manufactured by KANEKA CORPORATION, RKB3040 (epoxy equivalent: 230) manufactured by RESINOUS CHEMICALS CO., LTD., and the like, which are commercially available as rubber-like core-shell polymer-modified bisphenol A-type epoxy resin, can be particularly preferably used.

Kane Ace MX120, MX125 and MX130 contain 25 wt % of a rubber-like core-shell polymer having a rubber particulate core made of a styrene-butadiene copolymer, and Kane Ace MX960 and MX965 contain 25 wt % of a rubber-like core-shell polymer having a rubber particulate core made of a polysiloxane rubber (silicone rubber) such as polydimethyl siloxane and the like. In addition, RKB3040 manufactured by RESINOUS CHEMICALS CO., LTD. contains 29 wt % of a rubber-like core-shell polymer having a rubber particulate core made of a butadiene rubber.

In the present invention, (A) epoxy resin preferably has an embodiment comprising (E1) epoxy resin having an aromatic ring and an alicyclic skeleton and (E2) rubber-like core-shell polymer-modified epoxy resin, so as to impart an extremely high level of electrolytic solution-resistance to the objective resin composition.

In the embodiment using (E1) epoxy resin having an aromatic ring and an alicyclic skeleton and (E2) rubber-like core-shell polymer-modified epoxy resin as (A) epoxy resin, when a molar ratio of an aromatic ring and an alicyclic skeleton (aromatic ring/alicyclic skeleton) in (E1) epoxy resin having an aromatic ring and an alicyclic skeleton is not less than 2.5 (particularly not less than 3.0), a composition comprising 60-80 parts by weight (preferably 60-70 parts by weight) of (E1) epoxy resin having an aromatic ring and an alicyclic skeleton and 20-40 parts by weight (preferably 30-40 parts by weight) of (E2) rubber-like core-shell polymer-modified epoxy resin, per 100 parts by weight of (A) epoxy resin, is preferable, from the aspects of a balance of adhesiveness of the resin composition to a heat resistant metal such as stainless steel and the like.

In the embodiment of (A) epoxy resin comprising (E1) epoxy resin having an aromatic ring and an alicyclic skeleton and (E2) rubber-like core-shell polymer-modified epoxy resin, when a molar ratio of an aromatic ring and an alicyclic skeleton (aromatic ring/alicyclic skeleton) in (E1) epoxy resin having an aromatic ring and an alicyclic skeleton is less than 2.5 (particularly less than 2.1), a composition comprising 18-24 parts by weight of (E1) epoxy resin having an aromatic ring and an alicyclic skeleton, 42-56 parts by weight of a bisphenol-type epoxy resin (preferably bisphenol F-type epoxy resin) and 20-40 parts by weight of (E2) rubber-like core-shell polymer-modified epoxy resin, per 100 parts by weight of (A) epoxy resin, is preferable, from the aspects of a balance of adhesiveness of the resin composition to a heat resistant metal such as stainless steel and the like.

In an attempt to improve workability when the resin composition is applied to a part to be sealed (sealing part), and the like, a low viscosity epoxy resin (epoxy compound) having a cyclic skeleton (alicyclic skeleton) may be mixed besides the aforementioned epoxy resin to be used in combination, so as to adjust the viscosity of the resin composition. The low viscosity here means a viscosity at room temperature (25° C.)

of generally not more than 10 poise. Examples of the low viscosity epoxy resin having a cyclic skeleton include a cyclic terpene skeleton-containing monoepoxy compound obtained by reacting epihalohydrin with a cyclic terpene skeleton-containing monophenol compound obtained by adding an equimolar amount of a cyclic terpene phenol compound to phenol, phenylglycidyl ether, cyclohexane dimethanoldiglycidyl ether (e.g., "EP4085S" manufactured by ADEKA CORPORATION etc.), dicyclopentadiene diglycidyl ether (e.g., "EP4088S" manufactured by ADEKA CORPORATION etc.), resorcinoldiglycidyl ether (e.g., "DENACOL EX201" manufactured by Nagase ChemteX Corporation etc.), glycidyl orthotoluidine (e.g., "GOT" manufactured by Nippon Kayaku Co., Ltd. etc.), diglycidyl aniline (e.g., "GAN" manufactured by Nippon Kayaku Co., Ltd. etc.) and the like. When the low viscosity epoxy resin is used, the amount thereof to be used is not more than 30 parts by weight, preferably not more than 20 parts by weight, more preferably not more than 15 parts by weight, per 100 parts by weight of the epoxy resin of component A. This is because the electrolytic solution-resistance and adhesion to a collector and an outer package material tend to decrease when it exceeds 30 parts by weight, though dilution effect is high. When it is less than 5 parts by weight, the viscosity dilution effect is small. Thus, not less than 5 parts by weight is preferable, and not less than 7 parts by weight is more preferable.

In the resin composition of the present invention, the content of (A) epoxy resin is preferably not less than 55 wt %, more preferably not less than 58 wt %, still more preferably not less than 60 wt %, relative to the whole resin composition. In addition, not more than 85 wt % is preferable, 83 wt % is more preferable, not more than 80% is further preferable, and 75 wt % is still more preferable.

[(B) Latent Curing Agent]

The latent curing agent to be used in the present invention is preferably a latent modified polyamine-based curing agent. Specific examples thereof include microencapsulated imidazole group-containing modified polyamine (e.g., Novacure HX3721, HX3721, HX3921HP, HX3941HP manufactured by Asahi Kasei Chemicals Corporation etc.), dicyandiamide modified polyamine (e.g., EH3842 manufactured by ADEKA CORPORATION etc.), tertiary amino group-containing modified aliphatic polyamine (e.g., EH4380S, EH3615S manufactured by ADEKA CORPORATION etc.), imidazole group-containing modified polyamine (e.g., AJICURE, PN23, PN31, PN40, PN50, PN-H manufactured by Ajinomoto Fine-Techno Co., Inc., ADEKA HARDNER EH3293S, EH3366S, EH4346S manufactured by ADEKA CORPORATION etc.), urea bond-containing modified polyamine (e.g., FUJICURE FXR1000, FXR1110, FXR1121, FXR1081 manufactured by Fuji Chemical Industry Co., Ltd. etc.), urea bond-containing modified aliphatic polyamine (e.g., EH4353S manufactured by ADEKA CORPORATION), urea bond- and imidazole group-containing modified polyamine (e.g., FXR1110, FXR1121 manufactured by Fuji Chemical Industry Co., Ltd.), imidazole compound (e.g., CUREZOL 2MZ-A, 2MA-OK, 2PHZ, 2P4MHZ manufactured by SHIKOKU CHEMICALS CORPORATION etc.) and the like. Any one kind of the latent curing agents or two or more kinds thereof in combination. Among these, tertiary amino group-containing modified aliphatic polyamine, urea bond-containing modified polyamine (urea bond-containing modified aliphatic polyamine), imidazole group-containing modified polyamine, urea bond- and imidazole group-containing modified polyamine are preferable, tertiary amino group-containing modified aliphatic polyamine, urea bond-containing modified polyamine (urea bond-containing modified aliphatic polyamine), and urea bond- and imidazole group-containing modified polyamine are particularly preferable, from the aspects of electrolytic solution-resistance and adhesiveness to a stainless steel foil (stainless steel foil used for electrode terminal and collector).

The amount of the latent curing agent of the component B to be used in the resin composition of the present invention is 0.7-1.3 equivalents relative to the epoxy resin of component A ((A) epoxy resin). It is particularly preferably 0.9-1.1 equivalents from the aspects of the electrolytic solution-resistance and hardenability of the resin composition. When it is less than 0.7 equivalent, the curing tends to be slow and a sufficient crosslinked structure is difficult to be formed, as well as adhesive strength decreases and the organic solvent-resistance (electrolytic solution-resistance) tends to decrease. When it exceeds 1.3 equivalents, an unreacted curing agent present in the resin after curing tends to elute into an organic solvent (electrolytic solution), thus markedly lowering the battery property when the objective resin composition is used as a sealant of an organic electrolyte battery.

The resin composition of the present invention is constituted using at least the aforementioned (A) epoxy resin and (B) latent curing agent. It may further contain (C) co-curing agent and, using the co-curing agent (accelerator), the adhesiveness of the resin composition can be further improved, and the adhesiveness to a stainless steel foil can be particularly improved. Examples of the co-curing agent of component C include dicyandiamide, urea bond-containing modified aliphatic polyamine (e.g., EH4353S manufactured by ADEKA etc.) and the like, and a combined use of dicyandiamide and urea bond-containing modified aliphatic polyamine is particularly preferable.

The amount of the co-curing agent of component C to be used is 0.5-10 parts by weight per 100 parts by weight of the epoxy resin of component A. It is preferably 0.8-8 parts by weight, particularly preferably 1-5 parts by weight, from the aspects of the organic solvent-resistance (electrolytic solution-resistance) and hardenability of the composition. When it is less than 0.5 part by weight, sufficient contribution to the improvement of the adhesiveness to a stainless steel foil may not be provided, and when it exceeds 10 parts by weight, the organic solvent-resistance (electrolytic solution-resistance) of the composition tends to decrease. Thus, when the objective resin composition is used as a sealant of an organic electrolyte battery, it may elute into an electrolytic solution and the battery property may be impaired.

From the aspects of the improvement of the adhesiveness, workability of application of the resin composition, and the like, the resin composition of the present invention may be further mixed with (D) filler. The kind of the filler is not particularly limited, and any can be used as long as it is an inorganic filler. Specifically, talc, calcium carbonate, alumina, crystal silica, molten silica and the like can be mentioned. Only one kind of these may be used, or two or more kinds may be used in a mixture. Of these, talc is preferable from the aspects of adhesion to a metal foil such as stainless steel foil and the like (collector), and calcium carbonate is preferable from the aspects of organic solvent-resistance (electrolytic solution-resistance). The amount of (D) filler is preferably 15-60 parts by weight, more preferably 20-50 parts by weight, particularly preferably 25-50 parts by weight, per 100 parts by weight of the epoxy resin of component A. When it is less than 15 parts by weight, sufficient contribution to the improvement of the adhesiveness of the resin composition, workability of application of the resin composition, and the like may not be provided. When it exceeds 60 parts by weight, the viscosity of the resin composition tends to become high, and handling property during application may become poor. When talc and calcium carbonate are used in combination as (D) filler, the quantitative weight ratio thereof (talc:calcium carbonate) is preferably 1:2-6, more preferably 1:3-5.

The resin composition of the present invention may be mixed with various additives that can be generally used for resin compositions, as long as its effect is not inhibited. As various additives, pigment, dye, antifoaming agent, coupling agent, surfactant and the like can be mentioned. Since the adhesiveness can be improved and the viscosity can be decreased, a silane-based coupling agent and a titanate-based coupling agent are preferable.

Since the resin composition of the present invention is superior in the adhesiveness to a metal, can strongly adhere the opposing two metal surfaces, and has high organic solvent-resistance, it can be used as various functional chemical products. The metal here is not particularly limited, and includes various metals such as aluminum, aluminum-based alloy, copper, copper alloy, nickel, stainless steel and the like, which are widely used for apparatuses and members in various technical fields. Specific examples of the various functional chemical product include adhesive, sealant (sealant for coil, sealant for relay, sealant for organic electrolyte battery etc.), casting agent, coating agent (humidity resistant coat for various electronic parts etc.), paint (insulative paint for printed board etc.) and the like. Among these, it is particularly useful as a sealant for an organic electrolyte battery, since it shows an extremely high resistance to liquid electrolyte (organic electrolytic solution) of organic electrolyte battery, shows small degradation even when contacted with an organic electrolytic solution at a high temperature, and can obtain high adhesive force to a high-heat-resistant metal such as nickel, stainless steel and the like.

The resin composition of the present invention expresses superior adhesiveness and degradation resistance to an organic electrolytic solution by thermal curing. The thermal curing can be performed at about 100-120° C. for about 0.5-1.0 hr. Since it can be sufficiently cured even at a temperature of 100° C. or below, or 80° C. or below, when curing at a lower temperature is necessary, it may be thermally cured at around 80° C. Since the resin composition of the present invention in an uncured state before thermal curing is a liquid showing a viscosity at room temperature (25° C.) of 500-2500 poise (preferably 500-2000 poise), applying work is easy to perform, and the composition can be easily spread (thinned) after application by pressurization and the like. Therefore, when a part to be sealed has a complicated shape (form) or a narrow gap, a highly sealable sealing part can be formed, and a highly sealable sealing part can be formed even for a gap of not more than 50 μm. Specifically, a highly sealable sealing part can be formed between two metal surfaces opposing at a gap of 50 μm or below. For example, as is clear from the below-mentioned Examples, a sealed structure with a high adhesion strength, as evidenced by a peel strength of not less than 0.7 N/10 mm, when two pieces of stainless steel foil were adhered with the resin composition of the present invention interposed therebetween to give a test piece and the test piece was subjected to T-peel at a peel rate of 100 mm/min according to JIS K-6854-3, can be formed.

In addition, the resin composition of the present invention preferably has a glass transition temperature of a cured product obtained by heating (thermally-cured product) of not less than 100° C., more preferably not less than 120° C., particularly preferably not less than 140° C. When the glass transition temperature of the thermally-cured product is not less than 100° C., the degradation resistance to an organic electrolytic solution (electrolytic solution-resistance) can be improved further. The glass transition temperature of the thermally-cured product can be adjusted by changing the kind, amount (equivalent ratio to epoxy) and the like of the curing agent. When the glass transition temperature of the thermally-cured product is too high, the crosslinking density of the thermally-cured product becomes high, and the shrinkage on curing of the thermally-cured product tends to increase. Thus, the glass transition temperature is preferably not more than 200° C., more preferably not more than 180° C.

An organic electrolyte battery with a sealing part formed by using the resin composition of the present invention as a sealant (the organic electrolyte battery of the present invention) is explained in the following.

In general, an organic electrolyte battery such as lithium ion secondary battery and the like comprises, as a basic constitution, a positive electrode having, on a collector, an electrically connected positive electrode active material layer, a negative electrode having, on a collector, an electrically connected negative electrode active material layer, and an electrolyte layer arranged in between the positive electrode and the negative electrode as electric power components. An organic electrolyte battery comprising the resin composition of the present invention also has the same basic constitution. The resin composition of the present invention can be used for sealing of various parts to be sealed in an organic electrolyte battery, and can be used as a sealant to increase the sealability of an insulative gasket made of a resin in a prismatic battery or a cylindrical battery explained in the Background Art. In addition, it can be used as (1) a sealant for sealing a gap between an electrode terminal connected to a collector and an outer package (sheet), (2) a sealant for sealing a gap between marginal parts of the opposing collectors, (3) a sealant for sealing the marginal part of a sheet as an outer package and the like in a sheet outer-packaging type battery.

FIG. 1 provides schematic sectional views (FIG. 1 (a), FIG. 1 (b)) and a schematic plane view (FIG. 1 (c)) of an organic electrolyte battery of a first example of the present invention. FIG. 1 (a) is a sectional view at a position passing through an electrode terminal setting part and FIG. 1 (b) is a sectional view at a position other than the electrode terminal setting part.

In the battery 20, positive electrode 1 is constituted by a collector 2 and a positive electrode active material layer 3 formed on one principal surface of the collector 2, and negative electrode 4 is constituted by a collector 5 and a negative electrode active material layer 6 formed on one principal surface of the collector 5.

The collector 2 of the positive electrode 1 is made of a metal foil, and may be formed by one or plural metal elements, or one kind or plural metal elements and one kind or plural nonmetal elements. Specific examples include stainless steel (SUS) foil, nickel foil, aluminum foil, aluminum alloy foil and the like, with preference given to stainless steel foil. Conventionally, aluminum generally used for a collector has a comparatively low melting point (about 500° C.) among metals, and stainless steel can stand up to about 1200° C. Therefore, when a stainless steel foil is used as a collector, the heat resistance of the electrode is remarkably improved. Since nickel has a higher melting point than aluminum, a nickel foil is also preferable in heat resistance depending on the positive electrode to be used. While the thickness of the collector 2 is not particularly limited, it is generally 1-30 μm. The size of the collector 2 (flat plane area) is determined according to the object of use of the battery. Examples of the positive electrode active material contained in the positive electrode active material layer 3 include Li.Co-based composite oxide such as $LiCoO_2$ and the like, Li.Ni-based composite oxide such as $LiNiO_2$ and the like, Li.Mn-based composite oxide such as spinel $LiMn_2O_4$ and the like, Li.Fe-based composite oxide such as $LiFeO_2$ and the like and one obtained by substituting a part of these transition metals by other element and the like. These lithium-transition metal composite oxides are materials superior in the reactivity and cycle durability and low in cost. Using these materials for electrodes, therefore, a battery superior in output characteristics can be formed. Examples of such other positive electrode active materials include and phosphate compound and sulfate compound of transition metals and lithium such as $LiFePO_4$ and the like; transition metal oxides and sulfides such as $V_2O_5$, $MnO_2$, $TiS_2$, $MoS_2$, $MoO_3$ and the like; $PbO_2$, AgO, NiOOH and the like. In some cases, two or more kinds of positive electrode active materials may be used in combination. The positive electrode active material layer 3 is formed by mixing a positive electrode active material, a conductive agent such as graphite and the like, and a binding agent such as polyvinylidene fluoride (PVDF) and the like, dispersing the mixture in a solvent such as N-methyl-2-pyrrolidone (NMP) and the like to give a slurry (positive electrode mixture), applying the slurry to one principal surface of a collector 2, and drying and compressing the slurry. Though not particularly limited, a conductive agent is generally contained in about 5-10 parts by weight per 100 parts by weight of a positive electrode active material. The positive electrode active material layer 3 is preferably formed at a coverage of the positive electrode active material of about 1-50 mg/cm$^2$ of one surface of the collector.

A collector 5 of a negative electrode 4 is made of a metal foil and, for example, aluminum foil, nickel foil, copper foil, stainless steel foil and the like can be mentioned. Like collector 2 of the positive electrode, use of a stainless steel foil or nickel foil is preferable, since the heat resistance of the electrode can be improved remarkably. While the thickness of the collector 5 is not particularly limited, it is generally 1-30 μm. The size of the collector 2 (flat plane area) is determined according to the object of use of the battery. Examples of the negative electrode active material contained in the negative electrode active material layer 6 include various natural graphites and artificial graphites and, for example, graphites such as fibrous graphite, flake graphite, spherical graphite and the like, and various lithium alloys are preferably used. Specifically, carbon, graphite, metal oxide, lithium-metal composite oxide and the like can be used. Preferably, carbon or lithium-transition metal composite oxide can be used. These are materials superior in the reactivity and cycle durability and low in cost. Using these materials for electrodes, therefore, a battery superior in output characteristics can be formed. Examples of the lithium-transition metal composite oxide include lithium-titanium composite oxides such as $Li_4Ti_5O_{12}$ and the like, and the like. Examples of the carbon include graphite, hard carbon, soft carbon and the like. In some cases, two or more kinds of negative electrode active materials may be used in combination. The negative electrode active material layer 6 is formed by mixing a negative electrode active material, a conductive agent such as graphite and the like, and a binding agent such as polyvinylidene fluoride (PVDF) and the like, dispersing the mixture in a solvent such as N-methyl-2-pyrrolidone (NMP) and the like to give a slurry (negative electrode mixture), applying the slurry to one principal surface of a collector 5, and drying and compressing the slurry. The negative electrode active material layer 6 is preferably formed at a coverage of the negative electrode active material of about 1-50 mg/cm$^2$ of one surface of the collector.

An electrolyte layer 7 is disposed between a positive electrode 1 and a negative electrode 4, and an electric power component 10 is constituted by such positive electrode 1, negative electrode 4 and electrolyte layer 7.

While the electrolyte constituting the electrolyte layer 7 is not particularly limited, a liquid electrolyte or a gel polymer electrolyte (gel electrolyte) is used.

A liquid electrolyte is an organic electrolytic solution wherein a lithium salt as a supporting electrolyte is dissolved in an organic solvent as a plasticizer. While the organic solvent is not particularly limited, for example, organic solvent (plasticizer) such as an aprotic solvent and the like, and the like, which is one kind or a mixture of two or more kinds selected from cyclic carbonates such as propylenecarbonate (PC), ethylenecarbonate (EC) and the like; chain carbonates such as dimethylcarbonate, methylethylcarbonate, diethylcarbonate and the like; ethers such as tetrahydrofuran, 2-methyltetrahydrofuran, 1,4-dioxane, 1,2-dimethoxyethane, 1,2-dibutoxy ethane and the like; lactones such as γ-butyrolactone and the like; nitriles such as acetonitrile and the like; esters such as methyl propionate and the like; amides such as dimethylformamide and the like; methyl acetate, methyl formate, which contains at least one kind of a lithium salt selected from salts of inorganic acid anion such as LiBOB (lithium bisoxide borate), $LiPF_6$, $LiBF_4$, $LiClO_4$, $LiAsF_6$, $LiTaF_6$, $LiAlCl_4$, $Li_2B_{10}Cl_{10}$ and the like and salts of inorganic anion acid such as $LiCF_3SO_3$, $Li(CF_3SO_2)_2N$, $Li(C_2F_5SO_2)_2N$ and the like, can be mentioned.

On the other hand, gel polymer electrolyte has a constitution wherein the above-mentioned liquid electrolyte is injected into a matrix polymer (host polymer) comprised of an ion-conducting polymer or a matrix polymer comprised of a polymer without ion-conductivity. While the ion-conducting polymer to be used as a matrix polymer (host polymer) is not particularly limited, for example, polymers of polyethylene oxide (PEO), polypropylene oxide (PPO), polyvinylidene fluoride (PVDF) and hexafluoropyrene (HFP), PAN, PMMA and copolymers thereof and the like can be mentioned.

When electrolyte layer 7 is a liquid electrolyte or a gel polymer electrolyte, and the self-standing property is poor, the electrolyte layer 7 may be constituted together with a separator made of a fine porous polyolefin film of polyethylene, polypropylene and the like. To be specific, a separator impregnated with a liquid electrolyte and/or a gel polymer electrolyte is disposed between positive electrode 1 and negative electrode 4.

A matrix polymer in a gel polymer electrolyte forms a crosslinked structure and expresses a superior mechanical strength. To form a chemical crosslinked structure, a polymerization treatment such as thermal polymerization, ultraviolet ray polymerization, radiation polymerization, electron beam polymerization and the like only needs to be applied to a polymerizable polymer (e.g., PEO, PPO) for polymer electrolyte formation, by using a suitable polymerization initiator. To form a physical crosslinked structure, polymer chains only need to be physically crosslinked by dissolving a matrix polymer in a large amount of a solvent together with a liquid electrolyte, coating an electrode or separator therewith by a method such as casting and the like, and evaporating the solvent.

Which crosslinking method is to be used can be determined according to the form, production method and the like of the battery.

Electrode terminals (tab) 8, 9 are connected to a collector 2 of a positive electrode 1 and a collector 5 of a negative electrode 4, respectively, gaps between electrode terminal 8 and outer package 11A, 11B and between electrode terminal 9 and outer packages 11A, 11B are sealed by a cured product layer 12 of the resin composition of the present invention (FIG. 1 (a)), and the marginal parts of an outer package 11A on the positive electrode 1 side and an outer package 11B on the negative electrode 4 side except the setting parts of electrode terminals (tab) 8, 9 are sealed by a cured product layer 12 of the resin composition of the present invention (FIG. 1 (b)). As each of the electrode terminals 8, 9, a metal foil similar to the collectors 2, 5 of positive electrode 1, negative electrode 4 is used, and connected to the collectors 2, 5 by welding and the like. From the aspects of improved heat resistance of a battery, electrode terminals 8, 9 are preferably made of a stainless steel foil. While the thickness of the electrode terminals 8, 9 is not particularly limited, it is general about 50-500 μm. As the outer packages 11A, 11B, a metal foil of aluminum and the like, a resin sheet, or a laminated sheet thereof is used, which is specifically, for example, a laminated sheet with a three-layer structure of an inner layer constituted by a resin film superior in electrolytic solution-resistance and thermal adhesiveness, such as polyethylene, modified polyethylene, polypropylene, modified polypropylene, or, ionomer and the like, an intermediate layer constituted by, for example, a metal foil such as aluminum and the like, and an outer layer constituted by, for example, a resin film superior in electrical insulating property, such as polyamide-based resin, polyester-based resin and the like.

The thickness of the cured product layer 12 made of the resin composition of the present invention is not particularly limited, and can be appropriately selected from 1-1000 μm. To achieve a sealed state with higher reliability, a comparatively thin thickness is required. Thus, the upper limit of the thickness of a cured product layer is preferably 100 μm, more preferably 70 μm, further preferably 60 μm, still more preferably 50 μm, especially preferably 40 μm, and particularly preferably 30 μm. However, when the thickness is too thin, the adhesiveness tends to decrease. Therefore, the lower limit of the thickness of a cured product layer is preferably 1 μm, more preferably 2 μm, further preferably 5 μm, still more preferably 10 μm.

The battery in FIG. 1 was constituted by collectors 2, 5 of electrode plates (positive electrode 1, negative electrode 4) and electrode terminals 8, 9, which were separately constituted. In addition, the collectors 2, 5 of an electrode plate (positive electrode 1, negative electrode 4) may be directly extended to the marginal part of the outer package and used as electrode terminals (tab).

While the battery of FIG. 1 is a single-cell battery containing one electric power component, the battery of the present invention may be a stacked parallel battery or stacked series battery wherein a plurality of electric power components are provided. When an organic electrolyte battery is used as a drive battery of vehicle such as electric automobile, hybrid electric automobile and the like, the battery needs to show high capacitance and high voltage. Thus, a stacked parallel battery and a stacked series battery, provided with plural electric power components to afford high capacitance and high voltage of a battery are advantageously used. The stacked parallel battery and stacked series battery are explained in the following.

<Stacked Parallel Battery>

In the case of a stacked parallel battery, a positive electrode having a positive electrode active material layer electrically connected to both principal surfaces of a collector, a negative electrode having a negative electrode active material layer electrically connected to both principal surface of a collector, and an electrolyte layer arranged in between the positive electrode and the aforementioned negative electrode are alternately stacked, and the gap between each electrode terminal connected to the collector and the marginal part except the setting parts of electrode terminals are sealed by a cured product layer of the resin composition of the present invention. In this case, the constituent materials and thickness of the collector and active material layer of the positive electrode, the collector and active material layer of the negative electrode, the electrode terminal, outer package and the like are similar to those of battery 20 in the aforementioned FIG. 1.

<Stacked Series Battery>

A stacked series battery is a battery structure wherein the positive electrode having the positive electrode active material layer electrically connected to one principal surface of the collector, the negative electrode having the negative electrode active material layer electrically connected to the other principal surface of said collector, and the electrolyte layer arranged in between a positive electrode and a negative electrode are alternately stacked, or a battery obtained by stacking a plurality of single cells wherein a positive electrode having a positive electrode active material layer electrically connected to one surface of a collector, a negative electrode having the negative electrode active material layer electrically connected to one surface of a collector, and an electrolyte layer arranged in between the positive electrode and the negative electrode are alternately stacked. A stacked series battery is advantageous as compared to a stacked parallel battery, since a higher output density and higher voltage can be afforded.

Figure 2:
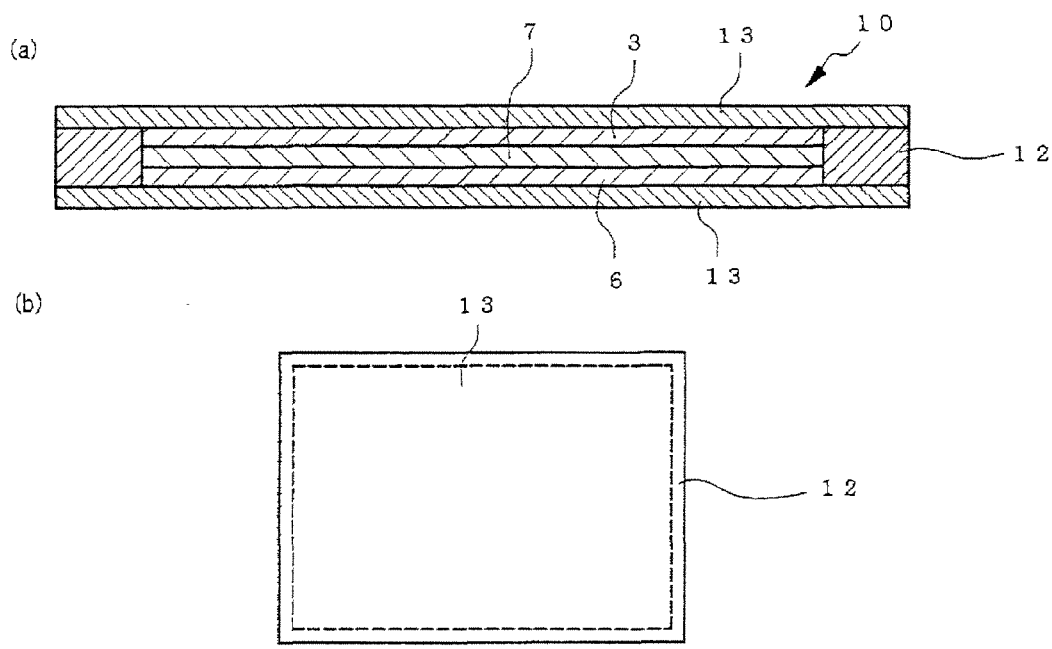
FIG. 2 provides a schematic sectional view of an electric power component (cell) in an organic electrolyte battery of other example of the present invention.
Figure 3:
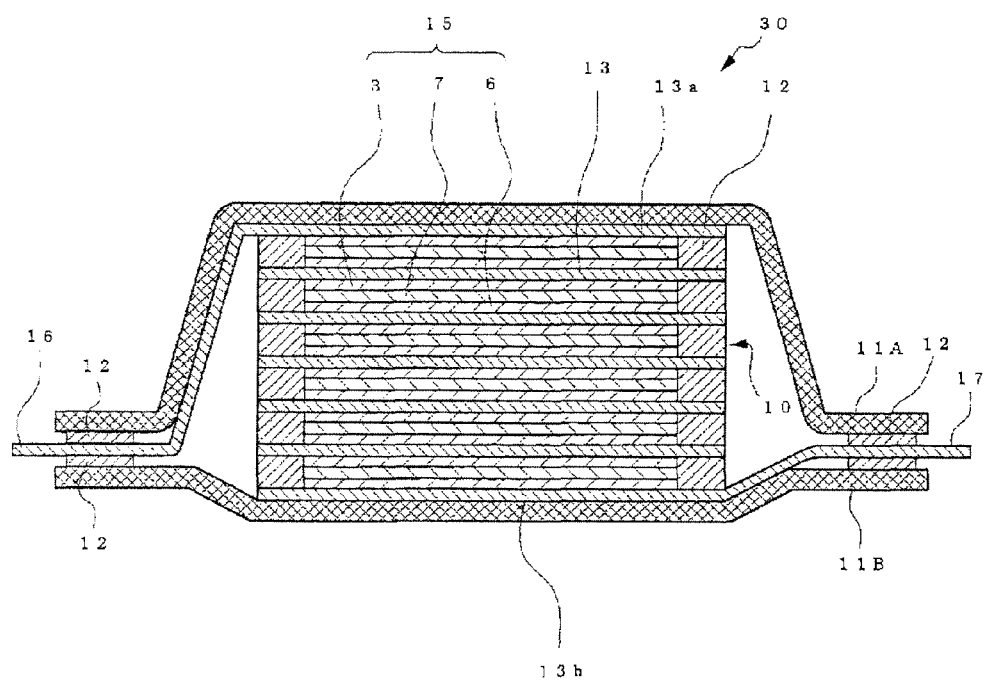
FIG. 3 provides a schematic sectional view of a stacked series battery completed by stacking the electric power component (cell) shown in FIG. 2 in multiplicity.

FIGS. 2, 3 show organic electrolyte batteries of a second example of the present invention. FIG. 2 provides a schematic sectional view (FIG. 2 (a)) and a plane view (FIG. 2 (b)) of an electric power component (cell) and FIG. 3 provides a schematic sectional view of a stacked series battery completed by stacking the electric power component (cell) shown in FIG. 2 in multiplicity.

In an electric power component (cell) 10, as shown in FIG. 2, one collector 13 wherein a positive electrode active material layer 3 is formed on the principal surface, and the other collector 13 wherein a negative electrode active material layer 6 is formed on the principal surface are opposed via an electrolyte layer 7, and the gap between the marginal parts of the opposing two collectors 13 are sealed by a cured product layer 12 made of the resin composition of the present invention.

As shown in FIG. 3, a stacked series battery 30 has a constitution wherein the electric power component (cell) 10 of FIG. 2 is formed in multiplicity, has a plurality of electrodes wherein positive electrode active material layer 3 and negative electrode active material layer 6 are formed on both principal surfaces of collector 13, and each electrode is stacked via electrolyte layer 7 to form the electric power component 10. In this case, each electrode and electrolyte layer 7 are stacked such that the positive electrode active material layer 3 of one electrode and the negative electrode active material layer 6 of the other electrode adjacent to the aforementioned one electrode face each other via electrolyte layer 7.

The adjacent positive electrode active material layer 3, electrolyte layer 7, and negative electrode active material layer 6 constitute one single-cell layer 15, and therefore, in stacked series battery 30 having a constitution wherein a plurality of single-cell layers 15 with a stacked unit of positive electrode/electrolyte layer/negative electrode are stacked between the opposing collectors 13, the gap between the adjacent collectors 13 is insulated on the outer circumference of the single-cell layer 15 by cured product layer 12 made of the resin composition of the present invention. The collectors 13a, 13b positioned in the both outermost layers comprise one of the positive electrode active material layer 3 and negative electrode active material layer 6 formed only on one surface.

The outermost layer collector 13a on the positive electrode side is extended to form a positive electrode terminal 16 which leads in between outer packages 11A, 11B, the outermost layer collector 13b on the negative electrode side is extended to form a negative electrode terminal 17 which leads in between outer packages 11A, 11B, and the gaps between positive electrode terminal 16 and outer packages 11A, 11B and between negative electrode terminal 17 and outer packages 11A, 11B are sealed with cured product layer 12 made of the resin composition of the present invention. It is also possible to separately form a positive electrode terminal in an outermost layer collector, which leads to the outside. In this case, a positive electrode terminal is joined with the outermost layer collector by pressure-adhesion, welding and the like. Preferably, it has a shape covering the whole electrode area of the projected part on the outermost layer collector.

A cured product of the resin composition of the present invention can adhere to a heat resistant metal such as stainless steel, nickel and the like used for a collector and an electrode terminal of an organic electrolyte battery with a high adhesive force, has high resistance to an organic electrolytic solution, and does not easily develop swelling, elution and the like even on contact with an organic electrolytic solution at a high temperature. Therefore, it can realize a highly reliable organic electrolyte battery which certainly prevents liquid junction (short-circuit) and the like due to the leaching of an organic electrolytic solution from the electrolyte layer 7 for a long time by tightly sealing gaps between marginal parts of the opposing collectors and between an electrode terminal and an outer package in electric power components by cured product layer 12 made of the resin composition of the present invention. In addition, it can seal a narrow gap of 50 μm or below to be sealed, which has been difficult with a polyolefin-based or modified polyolefin-based adhesive and a sealant film, which have conventionally used widely as a sealant of an organic electrolyte battery, and contributes to the thinning of an organic electrolyte battery.

In the present invention, therefore, for example, a thin single-cell layer having a stacked unit (electric power component) having a total thickness of 50 μm or below, which is comprised of positive electrode/electrolyte layer/negative electrode, between opposing collectors made of a stainless steel foil, wherein a gap between marginal parts of opposing collectors is sealed by a cured product made of the resin composition of the present invention, can be formed. Thus, using plural single-cell layers, a stacked parallel battery and a stacked series battery having a total thickness thinner than that of conventional batteries can be achieved while ensuring high capacitance and high voltage of the battery. Since the resin composition of the present invention can be sufficiently cured at 100° C. or below, or 80° C. or below, the sealing work of a marginal part of the collector can be performed at 100° C. or below, preferably 80° C. or below, and degradation of an electrolyte layer in the electric power components can be suppressed during the sealing work. Using the resin composition of the present invention as a sealant, therefore, a highly reliable organic electrolyte battery with high property can be achieved.

In the present invention, moreover, plural batteries explained above (the organic electrolyte battery of the present invention) are connected in parallel and/or series to constitute an assembled battery.

EXAMPLES

The present invention is explained in detail in the following by referring to Examples and Comparative Examples, which are not to be construed as limitative.

<Resin Composition>

Examples 1-6

Comparative Examples 1-4

Resin compositions having compositions shown in the following Table 1 were prepared.

The resin compositions were prepared by weighing an epoxy resin (Component A), a curing agent (Component B) and a co-curing agent (Component C), mixing them in a kneader for 10 min, adding a predetermined amount of a filler (Component D), mixing them for 20 min, passing the mixture two times through a three-roll mill, and mixing same with degassing in a kneader for 30 min.

The resin compositions of the Examples and Comparative Examples were measured for their physical properties (viscosity, glass transition temperature of cured product) by the following methods and subjected to the following evaluation tests.

1. Viscosity of Resin Composition (25° C.)

Using an E type viscometer (RE-80U manufactured by Toki Sangyo Co., Ltd.) and by the procedures according to JIS-K7117-2 and using a rotor at 3°×R9.7, the value at 5 rpm for 2 min was taken as the measured viscosity value.

2. Glass Transition Temperature of Cured Product of Resin Composition

A sample (thin film with flat plane size 7 mm×30 mm, thickness 0.1 mm) made of a cured product obtained by curing a resin composition under conditions at 100° C. for 1 hr was applied to a dynamic viscoelasticity apparatus DMA (DMS6100 manufactured by SII NanoTechnology Inc.), and tan δ peak value measured by the procedures according to JIS-K7198 and under conditions of 25° C.-200° C., temperature rise at 2° C./min, 1 Hz was taken as a glass transition temperature.

3. Electrolytic Solution-Resistance Test

A sample (diameter (φ) 24 mm×thickness 6 mm pellet: about 4 g) made of a cured product obtained by curing a resin composition under conditions at 100° C. for 1 hr was immersed in a mixture of propylenecarbonate/ethylenecarbonate=1/1 (weight ratio) at 80° C. for 7 days, and the weight was measured. An increasing rate of the weight of the sample after immersion to that before immersion was determined and evaluated according to the following five-grade criteria.

⊙: 0-5 wt %,
○: above 5 wt %-10 wt %,
Δ: above 10 wt %-15 wt %,
▲: above 15 wt %-20 wt %,
x: above 20 wt %, or swelling, dissolution 4. T-Peel Strength Test (Preparation of Test Piece)

Two pieces of acetone-defatted stainless steel foil of the same size (SUS 316-L, size: 15 μm×50 mm×70 mm) were prepared. A resin composition was applied to the whole surface of one stainless steel foil to a uniform thickness of 25 μm, the other stainless steel foil was laminated thereon, the laminate was cured at 100° C. for 1 hr using an oven, cooled to 25° C., and cut in a width 10 mm to give a test piece. The gap between the stainless steel foils was 25 μm.

(Peel Test)

The test was basically carried out according to JIS K-6854-3.

The test piece adhered and cured was subjected to T-peel at a crosshead speed 100 mm/min using TENSILON (RTM-500 manufactured by ORIENTEC Co., LTD.), and peel strength was measured. The results were evaluated according to the following four-grade criteria.

⊙ (Very Good): not less than 1.0 N/10 mm
○ (Good): 0.7 N/10 mm-less than 1.0 N/10 mm
Δ (Fair): 0.5 N/10 mm-less than 0.7 N/10 mm
x (Bad): less than 0.5 N/10 mm The test piece was immersed in a mixture of propylenecarbonate/ethylenecarbonate=1/1 (weight ratio) at 80° C. for 7 days, subjected to the same T-peel as above, and the peel strength was measured.

5. Cohesive Failure Rate

The area of the two fracture surfaces (two pieces of stainless steel foil) after peeling of the test piece after the T-peel test, where a cured product of the resin composition was attached, was determined for the attached area percentage (%) by visual inspection. The results were evaluated according to the following four-grade criteria.

The attached area percentage (%) is a proportion of the area of the attached part of the cured product (area of cohesive failure) to the whole adhered area (total area of the whole surface of two pieces of stainless steel foil).

⊙ (Very Good): 70-100%
○ (Good): 50-less than 70%
Δ (Fair): 30-less than 50%
x (Bad): 0-less than 30%

TABLE 1

| | starting material | | | Ex. 1 | Ex. 2 | Ex. 3 | Ex. 4 | Ex. 5 | Ex. 6 | Com. Ex. 1 | Com. Ex. 2 | Com. Ex. 3 | Com. Ex. 4 |
|---|---|---|---|---|---|---|---|---|---|---|---|---|---|
| Component A | epoxy resin | E1-1 | terpene structural skeleton-containing | EP9003 | 100 | 80 | 80 | 80 | 60 | 60 | | | | |
| | | | liquid bisphenol A-type | EP828 | | | | | | | 100 | | | 100 |
| | | | urethane modified | EPU-78-13S | | | | | | | | | 100 | |
| | | | oxazolidone ring-containing | EPU-1206 | | | | | | | | 100 | | |
| | | E2 | silicone rubber-based core-shell polymer modified | MX-960 | | 20 | 20 | 20 | 40 | 40 | | | | |
| Component B | curing agent | | tertiary amino group-containing, modified aliphatic polyamine | EH4380S | 11 | 11 | | | | | 15 | 14 | 14 | |
| | | | urea bond-containing modified aliphatic polyamine | FXR1000 | | | | 11 | | | | | | |
| | | | urea bond- and imidazole group-containing modified aliphatic polyamine | FXR1110 | | | | | 11 | 11 | 11 | | | |
| | | | trimethylolpropane tris(3-mercaptopropionate) | | | | | | | | | | | 70 |
| | | | imidazole group-containing modified polyamine | PN-H | | | | | | | | | | 3 |
| | | | triethyl borate | | | | | | | | | | | 0.5 |
| Component C | co-curing agent | | dicyandiamide | | 5 | 5 | 5 | 5 | | 3 | 5 | 5 | 5 | |
| | | | urea bond-containing modified aliphatic polyamine | EH4353S | 3 | 3 | 3 | 3 | | 3 | 3 | 3 | 3 | |
| Component D | filler | | talc | | 10 | 10 | 10 | 10 | 10 | 10 | 10 | 10 | 10 | 30 |
| | | | calcium carbonate | | 40 | 40 | 40 | 40 | 40 | 40 | 40 | 40 | 40 | 80 |
| Evaluation | electrolytic solution-resistance | weight change rate (%) | | | ▲ (18.6) | Δ (12.8) | Δ (14.2) | Δ (11.5) | ⊙ (1.5) | ○ (5.3) | — | ▲ (19.0) | — | X swelling, partially dissolving |
| | T-peel strength (N/10 mm) | before immersion | | | ⊙ 1.4 | ⊙ 1.9 | ⊙ 1.4 | ⊙ 2.2 | ○ 0.7 | ⊙ 1.2 | X 0.4 | X 0.4 | X 0.3 | ⊙ 4.2 |
| | | after immersion | | | ⊙ 1.0 | ⊙ 1.8 | ⊙ 1.2 | ⊙ 1.9 | ○ 0.8 | ⊙ 1.4 | Δ 0.5 | Δ 0.5 | X 0.4 | X 0 |
| | cohesive failure rate (%) | before immersion | | | ⊙ 100 | ⊙ 100 | ⊙ 100 | ⊙ 100 | ○ 50 | ⊙ 100 | X 0 | ⊙ 90 | ⊙ 100 | ⊙ 70 |
| | | after immersion | | | ⊙ 70 | ⊙ 70 | ○ 60 | ⊙ 80 | ○ 30 | ○ 65 | X 0 | Δ 30 | ⊙ 90 | X 0 |
| | glass transition temperature (° C.) | | | | 103 | 106 | 110 | 119 | 144 | 133 | 144 | 100 | 108 | 45 |

In Table 1, EP9003 is a terpene structural skeleton-containing epoxy resin manufactured by ADEKA CORPORATION (alicyclic skeleton content=25.1 wt %, molar ratio of aromatic ring and alicyclic skeleton (aromatic ring/alicyclic skeleton)=3.0, epoxy equivalent=250, viscosity (25° C.)=200 poise)), EP828 is a liquid bisphenol A-type epoxy resin (epoxy equivalent:190) manufactured by Japan Epoxy Resins Co. Ltd., EPU-78-13S is a urethane modified epoxy resin manufactured by ADEKA CORPORATION, EPU-1206 is an oxazolidone ring-containing epoxy resin manufactured by ADEKA CORPORATION, MX960 is a silicone rubber-based rubber-like core-shell polymer-modified epoxy resin manufactured by KANEKA CORPORATION, EH4380S is tertiary amino group-containing modified aliphatic polyamine manufactured by ADEKA CORPORATION, EH4353S is urea bond-containing modified aliphatic polyamine manufactured by ADEKA CORPORATION, FXR1000 is urea bond-containing modified aliphatic polyamine manufactured by Fuji Chemical Industry Co., Ltd., FXR1110 is urea bond- and imidazole group-containing modified aliphatic polyamine manufactured by Fuji Chemical Industry Co., Ltd., and PN-H is imidazole group-containing modified polyamine manufactured by Ajinomoto Fine-Techno Co., Inc.

Comparative Example 5

Two pieces of acetone-defatted stainless steel foil with the same size (SUS 316-L, size: 15 μm×50 mm×70 mm) were prepared, a polyolefin-based film with thickness 60 μm was sandwiched between the two pieces of stainless steel foil, the stainless steel pieces were adhered to each other by a heat press from the above and underneath at 180° C., pressure 0.5 MPa for 3 sec, and cut in width 10 mm to give a test piece. The test piece was subjected to the aforementioned peel test. As a result, the initial peel strength before immersing in an electrolytic solution was 13 N/10 mm and the adhesive strength was high. However, when the test piece was immersed in a mixture of propylenecarbonate/ethylenecarbonate=1/1 (weight ratio) at 80° C. for 7 days, the test piece was easily detached, and the peel strength was 0 N/10 mm.

While the production of a polyolefin-based film with a thickness thinner than 60 μm is possible, since the handling of the film becomes extremely difficult, use thereof as a sealing material of a battery is difficult.

Examples 7-13

Comparative Example 6

Resin compositions having compositions shown in the following Table 2 were prepared.

The resin compositions were prepared by weighing an epoxy resin (Component A), a curing agent (Component B) and a co-curing agent (Component C), mixing them in a kneader for 10 min, adding a predetermined amount of a filler (Component D), mixing them for 20 min, passing the mixture two times through a three-roll mill, and mixing same with degassing in a kneader for 30 min. The resin compositions after adjustment were subjected to the aforementioned test.

TABLE 2

| | | | starting material | | Ex. 7 | Ex. 8 | Ex. 9 | Ex. 10 | Ex. 11 | Ex. 12 | Ex. 13 | Com. Ex. 6 |
|---|---|---|---|---|---|---|---|---|---|---|---|---|
| Component A | epoxy resin | E1-1 | terpene structural skeleton-containing | EP9003-1 | 60 | | | | | | | |
| | | | | EP9003 | | 60 | | | | | | |
| | | | | EP9003-2 | | | 60 | | | | | |
| | | | | YL7291 | | | | | | | 18 | |
| | | E1-2 | dicyclopentadiene-type (aromatic ring-containing) | HP7200L | | | | 18 | | | | |
| | | | | HP7200 | | | | | 18 | | | |
| | | | | HP7200H | | | | | | 18 | | |
| | | | Bisphenol F | YDF8170 | | | | 42 | 42 | 42 | 42 | 42 |
| | | | dicyclopentadiene-type (aromatic ring-free) | EP4088S | | | | | | | | 18 |
| | | E2 | silicone-based rubber core-shell containing | MX960 | 40 | 40 | 40 | 40 | 40 | 40 | 40 | 40 |
| Component B | curing agent | | urea bond- and imidazole group-containing modified polyamine | FXR1110 | 11 | 11 | 11 | 11 | 11 | 11 | 11 | 11 |
| Component C | co-curing agent | | dicyandiamide | EH3636AS | 1 | 1 | 1 | 1 | 1 | 1 | 1 | 1 |
| | | | urea bond-containing modified aliphatic polyamine | EH4353S | 1 | 1 | 1 | 1 | 1 | 1 | 1 | 1 |
| Component D | filler | | talc | talc P4 | 10 | 10 | 10 | 10 | 10 | 10 | 10 | 10 |
| | | | calcium carbonate | W-SB | 40 | 40 | 40 | 40 | 40 | 40 | 40 | 40 |
| evaluation | viscosity (poise) | | E type viscometer 5 rpm | | 1026 | 1899 | 1953 | 1038 | 1137 | 1779 | 786 | 120 |
| | electrolytic solution resistance | | weight change rate (%) | | ☉ (2.4) | ☉ (2.3) | ☉ (2.3) | ☉ (0.9) | ☉ (0.6) | ☉ (0.8) | ☉ (0.8) | ☉ (1.8) |
| | T-peel strength (N/10 mm) | | before immersion | | ☉ 1.2 | ☉ 1.3 | ☉ 1.3 | ☉ 1.0 | ☉ 1.1 | ☉ 1.4 | ☉ 1.1 | X 0.4 |
| | | | after immersion | | ☉ 1.0 | ☉ 1.4 | ☉ 1.0 | ○ 0.9 | ☉ 1.0 | ☉ 1.2 | ○ 0.9 | Δ 0.5 |
| | cohesive failure rate (%) | | before immersion | | ☉ 100 | ☉ 100 | ☉ 100 | ☉ 70 | ☉ 100 | ☉ 100 | ☉ 100 | ☉ 50 |
| | | | after immersion | | ☉ 100 | ☉ 90 | ☉ 100 | ☉ 100 | ☉ 100 | ☉ 100 | ☉ 100 | ☉ 50 |
| | glass transition temperature (° C.) | | | | 142.2 | 144.5 | 144.7 | 171 | 173.7 | 175.8 | 144.7 | 128.9 |

In the description of Table 2 (except those overlapping with Table 1), EP9003-1 is a terpene structural skeleton-containing epoxy resin (low viscosity product of EP9003, viscosity (25° C.)=90 poise) manufactured by ADEKA CORPORATION, EP9003-2 is a terpene structural skeleton-containing epoxy resin (high viscosity product of EP9003, viscosity (25° C.)=230 poise) manufactured by ADEKA CORPORATION, YL7291 is a terpene structural skeleton-containing epoxy resin (alicyclic skeleton content=29.8 wt %, molar ratio of aromatic ring and alicyclic skeleton (aromatic ring/alicyclic skeleton)=2.0, epoxy equivalent: 229) manufactured by Japan Epoxy Resins Co. Ltd., HP-7200L is an aromatic ring-containing dicyclopentadiene-type epoxy resin (alicyclic skeleton content=31.8 wt %, molar ratio of aromatic ring and alicyclic skeleton (aromatic ring/alicyclic skeleton)=1.9, epoxy equivalent: 247) manufactured by DIC Corporation, HP-7200 is an aromatic ring-containing dicyclopentadiene-type epoxy resin (alicyclic skeleton content=40.5 wt %, molar ratio of aromatic ring and alicyclic skeleton (aromatic ring/alicyclic skeleton)=1.7, epoxy equivalent: 258) manufactured by DIC Corporation, HP-7200H is an aromatic ring-containing dicyclopentadiene-type epoxy resin (alicyclic skeleton content=52.1 wt %, molar ratio of aromatic ring and alicyclic skeleton (aromatic ring/alicyclic skeleton)=1.6, epoxy equivalent: 280) manufactured by DIC Corporation, YDF8170 is a liquid bisphenol F-type epoxy resin (epoxy equivalent: 160) manufactured by Tohto Kasei Co., Ltd., and EP-4088S is an aromatic ring-free dicyclopentadiene-type epoxy resin (epoxy equivalent: 173) manufactured by ADEKA CORPORATION.

Examples 14-20

Resin compositions having compositions shown in the following Table 3 were prepared.

The resin compositions were prepared by weighing an epoxy resin (Component A), a curing agent (Component B) and a co-curing agent (Component C), mixing them in a kneader for 10 min, adding a predetermined amount of a filler (Component D), mixing them for 20 min, passing the mixture two times through a three-roll mill, and mixing same with degassing in a kneader for 30 min. The resin compositions after adjustment were subjected to the aforementioned test.

TABLE 3

| | starting material | | | Ex. 14 | Ex. 15 | Ex. 16 | Ex. 17 | Ex. 18 | Ex. 19 | Ex. 20 |
|---|---|---|---|---|---|---|---|---|---|---|
| Component A | epoxy resin | E1-1 | terpene structural skeleton containing | EP9003 | 60 | 60 | 60 | 60 | | | |
| | | E1-2 | dicyclopentadiene-type (aromatic ring containing) | HP7200 | | | | | 18 | 18 | 18 |
| | | | bisphenol AD-type | ZX1059 | | | | | | | 40 |
| | | | bisphenol F-type | YDF8170 | | | | | 42 | 42 | 42 |
| | | E2 | silicone-based core-shell containing | MX960 | 40 | | | | 40 | | |
| | | | | MX965 | | 40 | | | | | |
| | | | acrylic core-shell containing | RKB3040 | | | | 40 | | | |
| | | | | MX125 | | | 40 | | | 40 | |
| Component B | curing agent | | urea bond imidazole group-containing modified polyamine | FXR1110 | 11 | 11 | 11 | 11 | 11 | 11 | 11 |
| Component C | co-curing agent | | dicyandiamide | EH3636AS | 1 | 1 | 1 | 1 | 1 | 1 | 1 |
| | | | urea bond-containing modified aliphatic polyamine | EH4353S | 1 | 1 | 1 | 1 | 1 | 1 | 1 |
| Component D | filler | | talc | talc P4 | 10 | 10 | 10 | 10 | 10 | 10 | 10 |
| | | | calcium carbonate | W-SB | 40 | 40 | 40 | 40 | 40 | 40 | 40 |
| evaluation | viscosity (poise) | | E type viscometer 5 rpm | | 1899 | 1446 | 654 | 1608 | 1137 | 1305 | 426 |
| | electrolytic solution resistance | | weight change rate (%) | | ⊙ (2.2) | ⊙ (3.0) | ⊙ (2.2) | ⊙ (2.9) | ⊙ (0.6) | ⊙ (0.6) | ⊙ (0.5) |
| | T-peel strength (N/10 mm) | | | before immersion | ⊙ 1.3 | ⊙ 1.5 | ○ 0.8 | ⊙ 1.2 | ⊙ 1.1 | ○ 0.9 | Δ 0.6 |
| | | | | after immersion | ⊙ 1.4 | ⊙ 1.6 | ○ 0.8 | ⊙ 1.0 | ⊙ 1.1 | ○ 0.8 | Δ 0.6 |
| | cohesive failure rate (%) | | | before immersion | ⊙ 100 | ⊙ 100 | ⊙ 90 | ⊙ 95 | ⊙ 100 | ⊙ 90 | ○ 50 |
| | | | | after immersion | ⊙ 90 | ⊙ 100 | ⊙ 90 | ⊙ 80 | ⊙ 100 | ⊙ 80 | ○ 50 |
| | glass transition temperature (° C.) | | | | 144.5 | 147.4 | 141.7 | 140.8 | 173.7 | 170 | 170.3 |

In the description of Table 3 (except those overlapping with Tables 1, 2), ZX1059 is a liquid bisphenol AD-type epoxy resin (epoxy equivalent: 165) manufactured by Tohto Kasei Co., Ltd., MX965 is a silicone rubber-based rubber-like core-shell polymer-modified epoxy resin (epoxy equivalent: 220) manufactured by KANEKA CORPORATION, and RKB3040 is a butadiene rubber-based rubber-like core-shell polymer-modified epoxy resin (epoxy equivalent: 230) manufactured by RESINOUS CHEMICALS CO., LTD.

Examples 21-28

Resin compositions having compositions shown in the following Table 4 were prepared.

The resin compositions were prepared by weighing an epoxy resin (Component A), a curing agent (Component B) and a co-curing agent (Component C), mixing them in a kneader for 10 min, adding a predetermined amount of a filler (Component D), mixing them for 20 min, passing the mixture two times through a three-roll mill, and mixing same with degassing in a kneader for 30 min. The resin compositions after adjustment were subjected to the aforementioned test.

(b) Formation of Negative Electrode

The following materials were mixed at a given ratio to give a negative electrode slurry. To be specific, a hard carbon as a negative electrode active material, and PVDF as a binder were used, and the negative electrode active material and binder were mixed at a ratio of 90 wt % and 10 wt %, respectively, 60 parts by mass of NMP as a solvent for adjusting slurry viscosity was added to 40 parts by mass of the mixture (NMP

TABLE 4

| | | | starting material | | Ex. 21 | Ex. 22 | Ex. 23 | Ex. 24 | Ex. 25 | Ex. 26 | Ex. 27 | Ex. 28 |
|---|---|---|---|---|---|---|---|---|---|---|---|---|
| Component A | epoxy resin | E1-1 | terpene structural skeleton containing | EP9003 | 60 | 60 | 60 | 60 | 60 | 60 | 60 | 60 |
| | | E2 | silicon-based core-shell containing epoxy | MX960 | 40 | 40 | 40 | 40 | 40 | 40 | 40 | 40 |
| Component B | curing agent | | urea bond, imidazole group-containing modified polyamine | FXR1110 | 11 | 8 | 15 | | | | | |
| | | | urea bond, imidazole group-containing modified polyamine | FXR1121 | | | | 15 | 11 | | | |
| | | | urea bond-containing modified polyamine | FXR1081 | | | | | | 15 | | |
| | | | imidazole group-containing modified polyamine | EH4356S | | | | | | | 11 | 15 |
| Component C | co-curing agent | | dicyandiamide | EH3636AS | 1 | 1 | 1 | 1 | 1 | 1 | 1 | 1 |
| | | | urea bond-containing modified aliphatic polyamine | EH4353S | 1 | 1 | 1 | 1 | 1 | 1 | 1 | 1 |
| Component D | filler | | talc | talc P4 | 10 | 10 | 10 | 10 | 10 | 10 | 10 | 10 |
| | | | calcium carbonate | W-SB | 40 | 40 | 40 | 40 | 40 | 40 | 40 | 40 |
| evaluation | viscosity (poise) | | E type viscometer 5 rpm | | 1899 | 2082 | 2236 | 2156 | 2487 | 2133 | 1477 | 1781 |
| | electrolytic solution resistance | | weight change rate (%) | | ⊙ (2.5) | ⊙ (2.1) | ⊙ (3.3) | ⊙ (3.2) | ⊙ (2.7) | ○ (7.7) | ○ (5.0) | ○ (7.6) |
| | T-peel strength (N/10 mm) | | before immersion | | ⊙ 1.0 | ⊙ 1.0 | ○ 0.9 | ○ 0.8 | ○ 0.9 | ⊙ 1.0 | ⊙ 1.3 | ⊙ 1.1 |
| | | | after immersion | | ○ 0.8 | ○ 0.8 | ⊙ 1.0 | ○ 0.8 | ○ 0.9 | ○ 0.9 | ⊙ 1.0 | ⊙ 1.1 |
| | cohesive failure rate (%) | | before immersion | | ⊙ 100 | ⊙ 100 | ⊙ 100 | ⊙ 100 | ⊙ 100 | ⊙ 90 | ⊙ 90 | ⊙ 90 |
| | | | after immersion | | ⊙ R90 | ⊙ 90 | ⊙ 90 | ⊙ 90 | ⊙ 90 | ⊙ 90 | ⊙ 90 | ⊙ 90 |
| | glass transition temperature (° C.) | | | | 139.6 | 135.6 | 141.2 | 137.2 | 132.3 | 106 | 105.4 | 100.1 |

<Stacked Series Battery>

Example 29

(1) Preparation of Electrode (a) Formation of Positive Electrode

The following materials were mixed at a given ratio to give a positive electrode slurry. To be specific, $LiMn_2O_4$ as a positive electrode active material, acetylene black as a conductive auxiliary agent, and polyvinylidene fluoride (PVDF) as a binder were used, the positive electrode active material, conductive auxiliary agent and binder were mixed at a ratio of 85 wt %, 5 wt % and 10 wt %, respectively, 60 parts by mass of N-methyl-2-pyrrolidone (NMP) as a solvent for adjusting slurry viscosity was added to 40 parts by mass of the mixture (NMP was added until the viscosity optimal for the application step was achieved), and they were mixed to give a positive electrode slurry.

The positive electrode slurry was applied to one surface of a collector comprised of a stainless steel (SUS) foil with thickness 20 μm, and dried to form a positive electrode comprised of an electrode layer (positive electrode active material layer) with thickness 10 μm.

was added until the viscosity optimal for the application step was achieved), and they were mixed to give a negative electrode slurry.

The negative electrode slurry was applied to the opposite surface of the collector on which the positive electrode was formed, and dried to form a negative electrode comprised of an electrode layer (negative electrode active material layer) with thickness 11 μm. In this case, the positive electrode and the negative electrode were formed while adjusting the areas of the positive electrode and the negative electrode to be the same, and projection drawings of the positive electrode and the negative electrode onto the collector to be the same.

(c) Preparation of Stacked Series Electrode

As mentioned above, the positive electrode and the negative electrode were respectively formed on the both surfaces of a SUS foil to be a collector, whereby a stacked series electrode was formed. The stacked series electrode was cut out in length 160 mm×width 130 mm, and the electrode layer on the outer circumference of the positive electrode and the negative electrode was peeled off by 10 mm to expose the SUS surface of the collector, whereby a stacked series electrode having an electrode area of 140 mm×110 mm, and a SUS foil to be the collector which was exposed by width 10 mm on the outer circumference, was prepared.

(2) Completion of Stacked Series Electrode and Electrolyte Layer

The following materials were mixed at a given ratio to give an electrolyte material.

An electrolytic solution (90 wt %) which is a mixture of propylenecarbonate (PC) and ethylenecarbonate (EC) (1:1 (volume ratio)), containing 1.0M $LiPF_6$, as an electrolytic solution, a polyvinylidene fluoride-hexafluoropropylene copolymer (PVDF-HFP, 10 wt %) containing 10% of an HFP component, as a host polymer, and dimethylcarbonate (DMC, 200 parts by mass relative to 100 parts by mass of the total amount of the electrolytic solution and PVDF-HFP) (NMP was added until the viscosity optimal for the application step was achieved) as a solvent for adjusting viscosity, were mixed to give a pregel electrolyte (pregel solution).

The pregel electrolyte (pregel solution) was applied to the whole surface of the positive electrode and negative electrode on the both surfaces of the stacked series electrode formed earlier. DMC was removed by vacuum drying, and the pregel electrolyte was dried to complete a stacked series electrode containing a gel electrolyte in (the void of) the positive electrode and negative electrode (impregnated with gel electrolyte).

(3) Formation of Sealing Precursor

A sealing precursor (resin composition of Example 6) was applied with a dispenser to the electrode uncoated part in the positive electrode peripheral part of the stacked series electrode obtained above (all four sides of the outer circumference of the electrode).

Then, a polyolefin separator (thickness 12 μm) having fine pores was set to cover the whole SUS foil to be the collector on the positive electrode side.

Thereafter, from the top of the separator, the resin composition of Example 6 was applied using a dispenser to an electrode uncoated part (=gel electrolyte uncoated part; the same as the part applied with the aforementioned sealing precursor) in the gel electrolyte uncoated part near the outer circumference in the gel electrolyte layers, whereby the separator on the outer circumference of the gel electrolyte layer was impregnated. Here, the resin composition of Example 6 was applied in several portions as necessary, so that the sealing precursor was positioned inside the separator (impregnation) and the top thereof (position corresponding to the uncoated part of electrode in the periphery of the negative electrode).

(4) Stacking

The stacked series electrodes (13 sheets) carrying the gel electrolyte layer obtained above were tightly sealed in vacuum and stacked such that the positive electrode (active material layer) and the negative electrode (active material layer) were successively stacked to be opposed to each other via the gel electrolyte layer, whereby a stacked series battery component (battery structure) comprising stacked 12 single-cell layers was prepared.

(5) Preparation of Stacked Series Battery Component (Battery Structure)

The stacked series battery component (battery structure) obtained above was heat pressed with a heat pressing machine at surface pressure of 1 kg/cm² at 100° C. for 1 hr to cure a sealing precursor comprised of the resin composition of Example 6. By this step, the sealing precursor was cured thin (between respective layers, to thickness (about 33 μm) equivalent to the total thickness of positive electrode, negative electrode and separator in each layer, and as a whole battery, to thickness (about 700 μm) equivalent to the electrode) to form a sealing part, whereby a given sealed structure could be formed.

By the above operations, a 12 series (12 cell series) structural stacked series battery component (battery structure) comprising stacked 12 single-cell layers (single cells) was prepared.

(6) Completion of Stacked Series Battery

The electrode structure prepared as mentioned above was placed in an aluminum laminate pack with a positive electrode tab and a negative electrode tab extruding from the pack, whereby a stacked series battery was completed.

Example 30

In the same manner as in Example 29 except that the resin composition of Example 11 using a dicyclopentadiene-type epoxy resin was used as an epoxy resin instead of the resin composition of Example 6, a stacked series battery was prepared.

Comparative Example 7

In the same manner as in Example 29 except that the resin composition of Comparative Example 4 not using a terpene structural skeleton-containing epoxy resin was used as an epoxy resin instead of the resin composition of Example 6, a stacked series battery was prepared.

The batteries prepared in the above-mentioned Examples 29 and 30 and Comparative Example 7 were subjected to a charge and discharge cycle test. The temperature environment was 55° C., the upper limit voltage was 50.4 V, the lower limit voltage was 25 V, constant current-constant voltage charging (CC-CV) was employed for charging at 100 mA, and constant current discharging (CC) was employed for discharging.

In the battery of Comparative Example 7, the capacity became half when the number of cycle exceeded 200, the capacity became zero at 250 cycles, and charge and discharge could not be performed. When the battery was disassembled and examined, the sealing part was found to have swollen with the electrolytic solution, and interfacially peeled, due to which the electrolytic solution leaked outside from the sealing part. The results are considered to reveal that a cured product of a resin composition not using a terpene structural skeleton-containing epoxy resin as an epoxy resin has low electrolytic solution resistance, and cannot maintain adhesion to stainless steel, thus permitting easy leakage of the electrolytic solution. In contrast, even after charge and discharge exceeding 500 cycles, remarkable capacity degradation was not confirmed in the battery of Example 29 wherein a sealing part was formed from a resin composition using a terpene structural skeleton-containing epoxy resin as a main epoxy resin. In addition, after 200 cycles, remarkable capacity degradation was not confirmed in the battery of Example 30 wherein a sealing part was formed from a resin composition using a dicyclopentadiene-type epoxy resin as a main epoxy resin, and the capacity similar to that of Example 29 was maintained.

INDUSTRIAL APPLICABILITY

Since the resin composition of the present invention is superior in the adhesiveness to a metal, heat resistance and organic solvent-resistance, it can be used as an adhesive, a coating agent and the like to be applied to one except for a sealing part of a primary battery and a secondary battery using an electrolytic solution, and further, use thereof as a sealant, an adhesive, a coating agent, a potting agent and the like for an electronic device component in electronic equipment for industrial use, household use and the like can also be expected.

EXPLANATION OF SYMBOLS 1 positive electrode
2, 5, 13 collectors
3 positive electrode active material layer
4 negative electrode
6 negative electrode active material layer
7 electrolyte layer
12 cured product of resin composition

What is claimed is:

1. A resin composition comprising
   (A) an epoxy resin comprising at least (E1) an epoxy resin having an aromatic ring and an alicyclic skeleton, and (E2) a rubber-like core-shell polymer-modified epoxy resin; and
   (B) a latent curing agent and
   (C) a co-curing agent
   wherein, (E2) the rubber-like core-shell polymer-modified epoxy resin comprises a rubber-like core-shell polymer, and
   wherein, the rubber-like core-shell polymer is a polymer which can be obtained by graft-polymerizing 50-95 wt % of (X-1) rubber particulate core and 5-50 wt % of (X-2) shell layer, and
   wherein, the (X-1) rubber particulate core is selected from the group consisting, of (i) a rubber elastic body, (ii) a polysiloxane rubber-based elastic body, and mixtures thereof, and
   wherein, the (i) rubber elastic body is constituted by not less than 50 wt % of one or more kinds of monomers selected from the group consisting of a diene-based monomer and a (meth)acrylate ester monomer, and less than 50 wt % of other copolymerizable vinyl monomer, and
   wherein, the (X-2) shell layer is constituted by one or more kinds of monomers selected from the group consisting of (meth)acrylate ester, aromatic vinyl, vinyl cyanide, epoxyalkylvinylether, unsaturated acid derivative, (meth)acrylamide derivative and maleimide derivative, and,
   wherein (C) the co-curing agent comprises dicyandiamide.

2. The resin composition according to claim 1, wherein (E1) epoxy resin is (E1-1) a terpene structural skeleton-containing epoxy resin having a cyclic terpene compound residue as an alicyclic skeleton.

3. The resin composition according to claim 1, wherein (E1) epoxy resin is (E1-2) dicyclopentadiene-type epoxy resin having o dicyclopentadiene residue as an alicyclic skeleton.

4. The resin composition according to claim 1, comprising 60-80 parts by weight of (E1) epoxy resin and 20-40 parts by weight of (E2) rubber-like core-shell polymer-modified epoxy resin, per 100 parts by weight of (A) epoxy resin, wherein (E1) epoxy resin has a molar ratio of the aromatic ring and the alicyclic skeleton (aromatic ring/alicyclic skeleton) of not less than 2.5.

5. The resin composition according to claim 1, comprising 18-24 parts by weight of (E1) epoxy resin, 42-56 parts by weight of a bisphenol-type epoxy resin, and 20-40 parts by weight of (E2) rubber-like core-shell polymer-modified epoxy resin, per 100 parts by weight of (A) epoxy resin, wherein (E1) epoxy resin has a molar ratio of the aromatic ring and the alicyclic skeleton (aromatic ring/alicyclic skeleton) of less than 2.5.

6. The resin composition according to claim), wherein (B) latent curing agent is tertiary amino group-containing modified aliphatic polyamine.

7. The resin composition according to claim 1, wherein (B) latent curing agent is urea bond-containing modified polyamine.

8. The resin composition according to claim 1, wherein (B) latent curing agent is urea bond- and imidazole group-containing modified polyamine.

9. The resin composition according to claim 1, wherein a thermally-cured product has a glass transition temperature of not less than 100° C.

10. The resin composition according to claim 1, which shows a peel strength of not less than 0.7 N/10 mm, when two pieces of stainless steel foil were laminated with the resin composition interposed therebetween to give a test piece and the test piece was subjected to T-peel at a peel rate of 100 mm/min according to JIS K-6854-3.

11. A sealant for an organic electrolyte battery, comprising the resin composition according to claim 1.

12. An organic electrolyte battery comprising a resin composition of claim 1 wherein the resin composition seals a gap between an electrode terminal connected to a collector and an outer package and/or between marginal parts of the opposing collectors.

13. The organic electrolyte battery according to claim 12, wherein the gap between the electrode terminal connected to the collector and the outer package and/or the gap between the marginal parts of the opposing collectors is/arc within the range of 10-50 μm.

14. The organic electrolyte battery according to claim 12, comprising a positive electrode having, on a collector, a positive electrode active material layer electrically connected thereto,
   a negative electrode having, on a collector, a negative electrode active material layer electrically connected thereto and
   an electrolyte layer arranged in between the positive electrode and the negative electrode.

15. The organic electrolyte battery according to claim 14, which is a stacked series battery wherein the positive electrode having the positive electrode active material layer electrically connected to one principal surface of the collector, the negative electrode having the negative electrode active material layer electrically connected to the other principal surface of said collector, and the electrolyte layer arranged in between a positive electrode and a negative electrode are alternately stacked.

16. The organic electrolyte battery according to claim 12, wherein the collector and the electrode terminal are made of a stainless steel foil.

17. An organic electrolyte battery comprising one or plural single-cell layers, each comprising a stacked unit of positive electrode/electrolyte layer/negative electrode between opposing collectors, wherein a gap between marginal parts of the opposing collectors is sealed by a cured product of the resin composition according to claim 1, the total thickness of the positive electrode/electrolyte layer/negative electrode is not more than 50 μm, and the cured product of the aforementioned resin composition was obtained by heating at not more than 100° C.

18. The organic electrolyte battery according to claim 17, wherein the collector and the electrode terminal are made of a stainless steel foil.

\* \* \* \* \*

UNITED STATES PATENT AND TRADEMARK OFFICE
CERTIFICATE OF CORRECTION

PATENT NO. : 8,574,745 B2  
APPLICATION NO. : 13/325647  
DATED : November 5, 2013  
INVENTOR(S) : Hiroshi Amano et al.

Page 1 of 1

It is certified that error appears in the above-identified patent and that said Letters Patent is hereby corrected as shown below:

In the Claims

Col. 34, claim 6, line 7, "claim)" should be --claim 1--.

Signed and Sealed this
Thirtieth Day of September, 2014

Michelle K. Lee
*Deputy Director of the United States Patent and Trademark Office*